United States Patent
Toyama et al.

(10) Patent No.: US 7,929,086 B2
(45) Date of Patent: Apr. 19, 2011

(54) LAMINATED FILM

(75) Inventors: Yuusuke Toyama, Ibaraki (JP);
Masayuki Satake, Ibaraki (JP); Kenji Yoda, Ibaraki (JP); Masatoshi Tomonaga, Ibaraki (JP); Shuuji Yano, Ibaraki (JP)

(73) Assignee: Nitto-Denko Corporation, Ibaraki-shi, Osaka (JP)

( * ) Notice: Subject to any disclaimer, the term of this patent is extended or adjusted under 35 U.S.C. 154(b) by 367 days.

(21) Appl. No.: 12/090,307

(22) PCT Filed: Sep. 14, 2006

(86) PCT No.: PCT/JP2006/318255
§ 371 (c)(1),
(2), (4) Date: Apr. 15, 2008

(87) PCT Pub. No.: WO2007/046202
PCT Pub. Date: Apr. 26, 2007

(65) Prior Publication Data
US 2009/0279030 A1    Nov. 12, 2009

(30) Foreign Application Priority Data

Oct. 20, 2005 (JP) ................................. 2005-305198

(51) Int. Cl.
*G02F 1/1335* (2006.01)
*G02B 5/30* (2006.01)
*G02B 1/08* (2006.01)

(52) U.S. Cl. ........... 349/117; 349/96; 349/118; 359/500

(58) Field of Classification Search .................. 349/117, 349/56, 96, 122, 138, 118; 359/500
See application file for complete search history.

(56) References Cited

U.S. PATENT DOCUMENTS

| 5,880,800 A | * | 3/1999 | Mikura et al. | ................ 349/122 |
| 6,285,430 B1 | | 9/2001 | Saito | |
| 6,888,592 B2 | * | 5/2005 | Kitagawa et al. | ................ 349/96 |

(Continued)

FOREIGN PATENT DOCUMENTS
CN          1683464 A          10/2005

(Continued)

OTHER PUBLICATIONS

Chinese Office Action dated Mar. 1, 2010, issued in corresponding Chinese Patent Application No. 200680032607.1.

(Continued)

*Primary Examiner* — Brian M Healy
(74) *Attorney, Agent, or Firm* — Westerman, Hattori, Daniels & Adrian, LLP

(57) ABSTRACT

A laminated film includes a polarizing plate, a retardation film, and a first pressure-sensitive adhesive layer provided in this order, wherein the polarizing plate includes a polarizer, a first protective layer placed on a side of the polarizer where the retardation film is provided, and a second protective layer placed on another side of the polarizer which is opposite to the side where the retardation film is provided, the retardation film is a stretched film comprising a norbornene resin,
the first pressure-sensitive adhesive layer includes a pressure-sensitive adhesive that may be produced by crosslinking a composition comprising a (meth)acrylate (co)polymer and a crosslinking agent comprising a peroxide as a main component. The laminated film has both good adhesion to a liquid crystal cell and easy peelability, and may improve the uniformity in a screen of liquid crystal display.

18 Claims, 5 Drawing Sheets

U.S. PATENT DOCUMENTS

| | | | |
|---|---|---|---|
| 2002/0140882 A1* | 10/2002 | Kitagawa et al. | 349/96 |
| 2006/0127606 A1 | 6/2006 | Ogasawara et al. | |
| 2007/0182898 A1* | 8/2007 | Yamaoka et al. | 349/117 |
| 2009/0231519 A1* | 9/2009 | Toyama et al. | 349/96 |
| 2009/0279030 A1* | 11/2009 | Toyama et al. | 349/117 |

FOREIGN PATENT DOCUMENTS

| | | |
|---|---|---|
| JP | 11-305217 A | 11/1999 |
| JP | 2003-277705 A | 10/2003 |
| JP | 2004-264333 A | 9/2004 |
| JP | 2005-242171 A | 9/2005 |
| JP | 2005-325340 A | 11/2005 |
| JP | 2006-169428 A | 6/2006 |
| WO | 2004/068201 A1 | 8/2004 |

OTHER PUBLICATIONS

International Search Report of PCT/JP2006/318255; date of mailing Dec. 26, 2006.

Notification of Transmittal of Translation of the International Preliminary Report on Patentability (Form PCT/IB/338) of International Application No. PCT/JP2006/318255 mailed Jul. 31, 2008 with Forms PCT/IB/373 and PCT/ISA/237.

* cited by examiner

[FIG. 1]
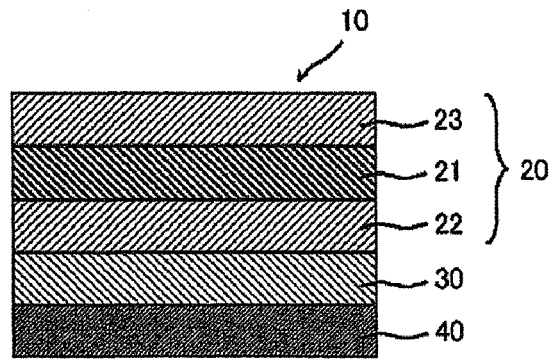
[FIG. 2]
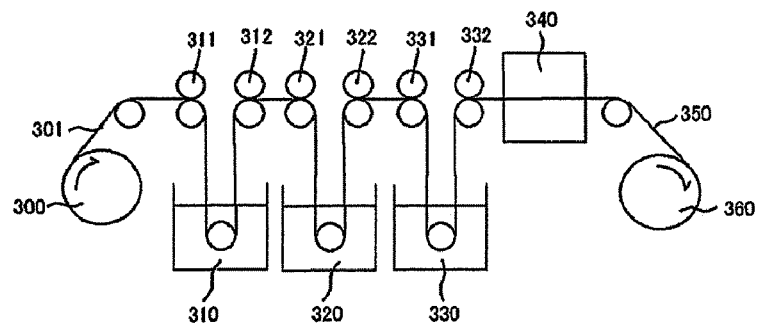
[FIG. 3]
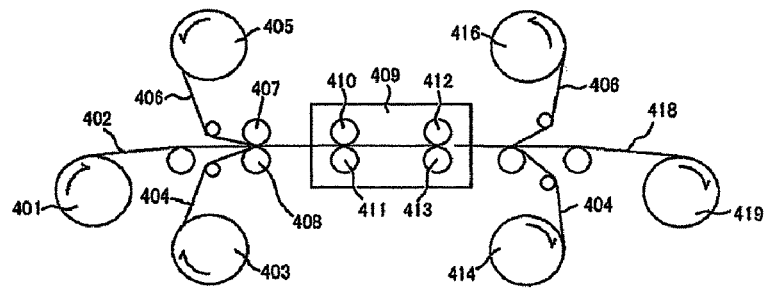
[FIG. 4]
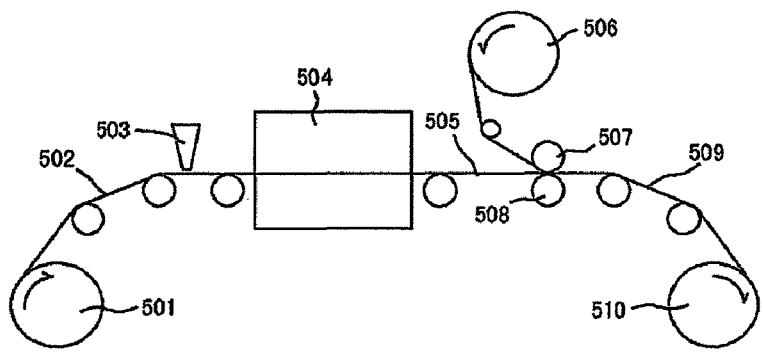

[FIG.5]
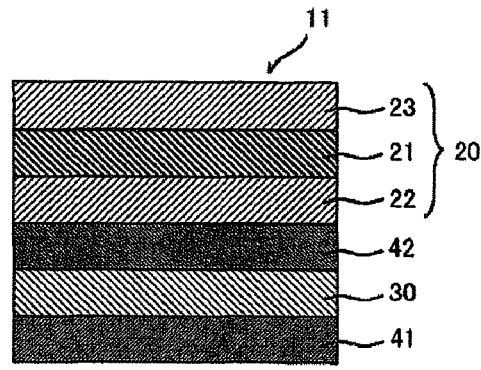
[FIG.6]
(a)
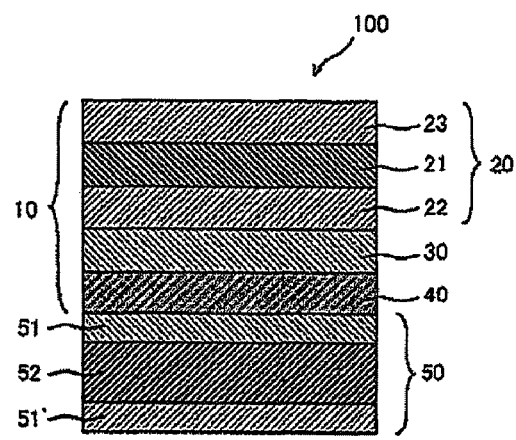
(b)
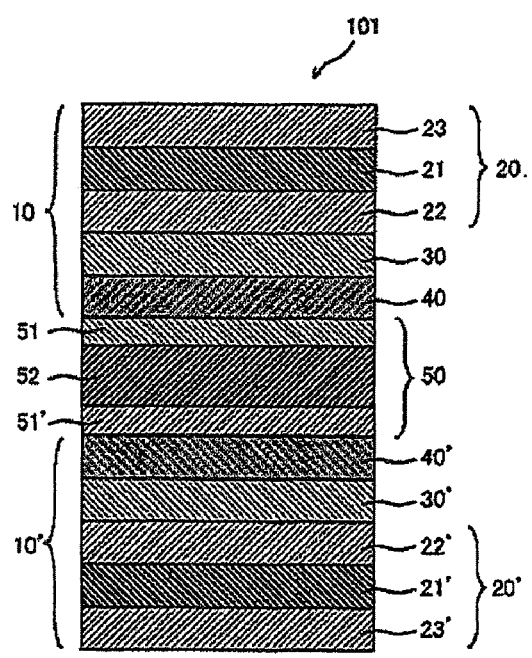

[FIG.7]
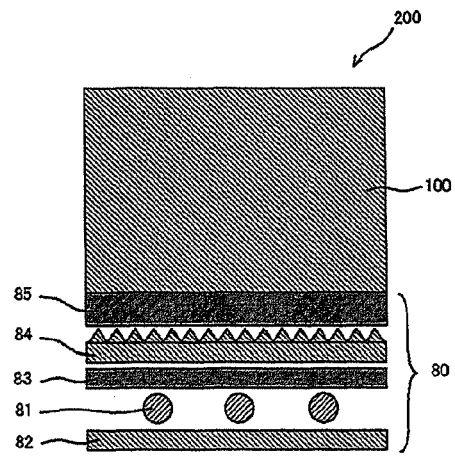
[FIG.8]
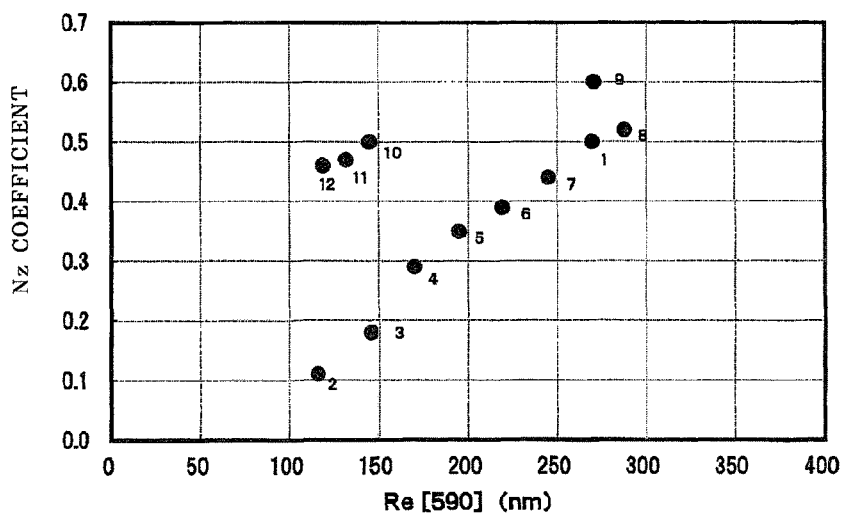
[FIG.9]
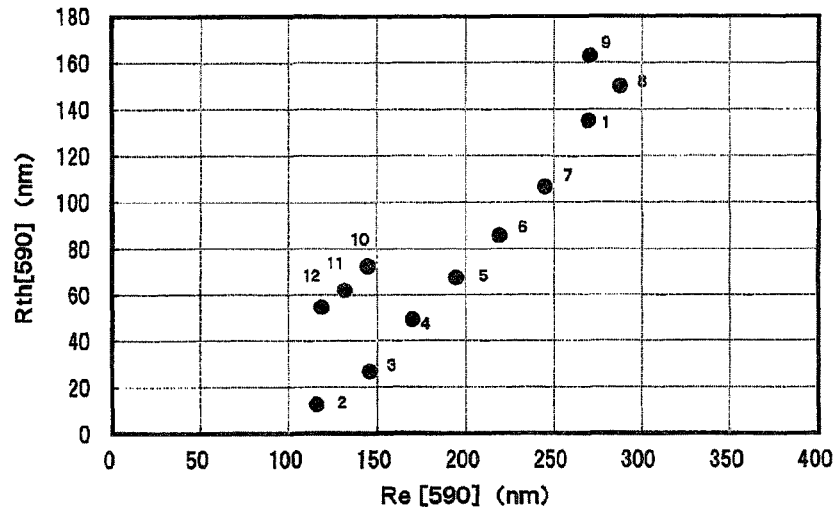

[FIG.10]
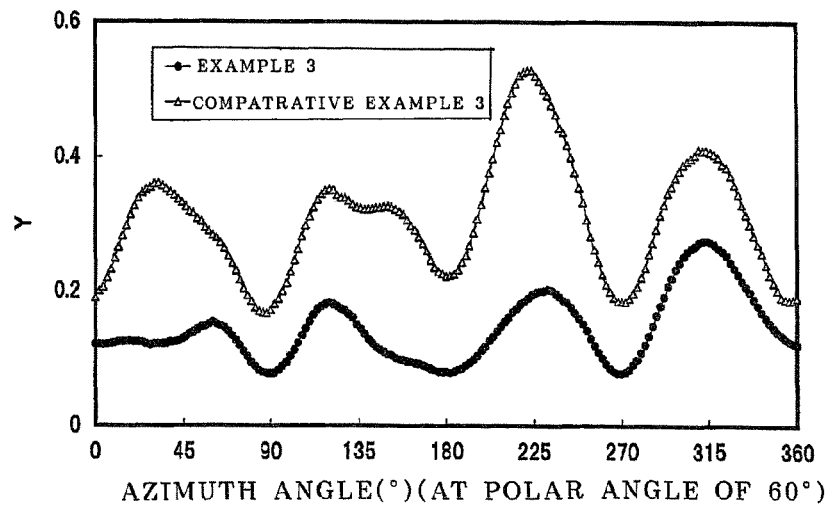
[FIG.11]
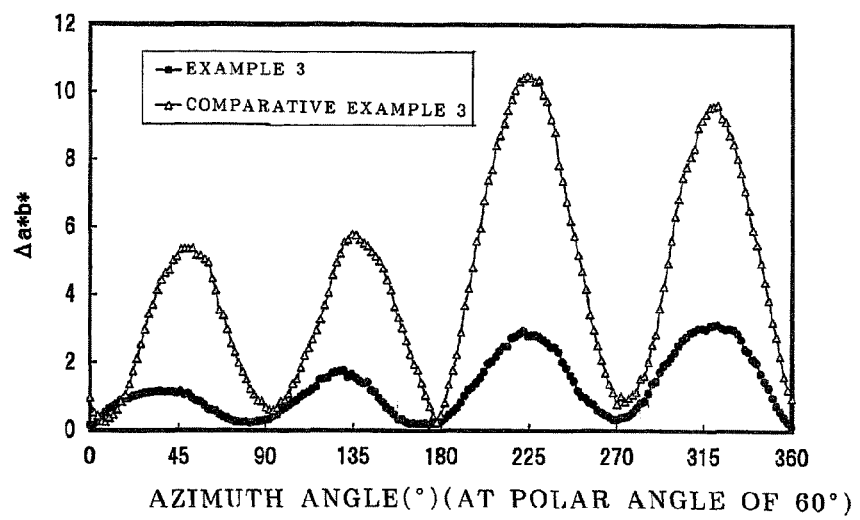
[FIG.12]
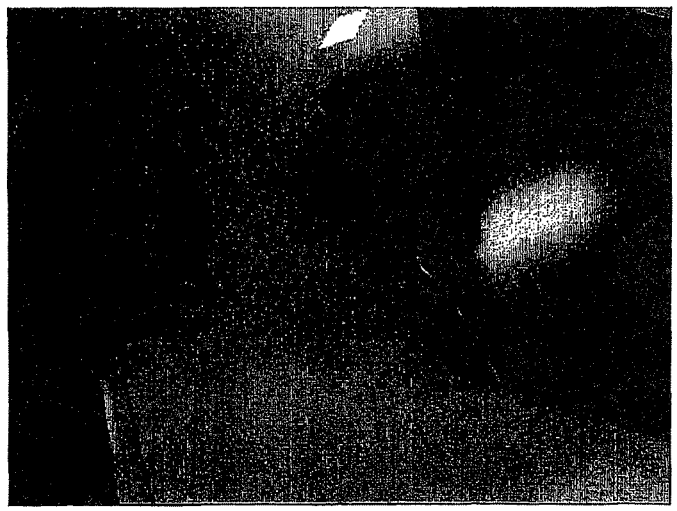

[FIG.13]
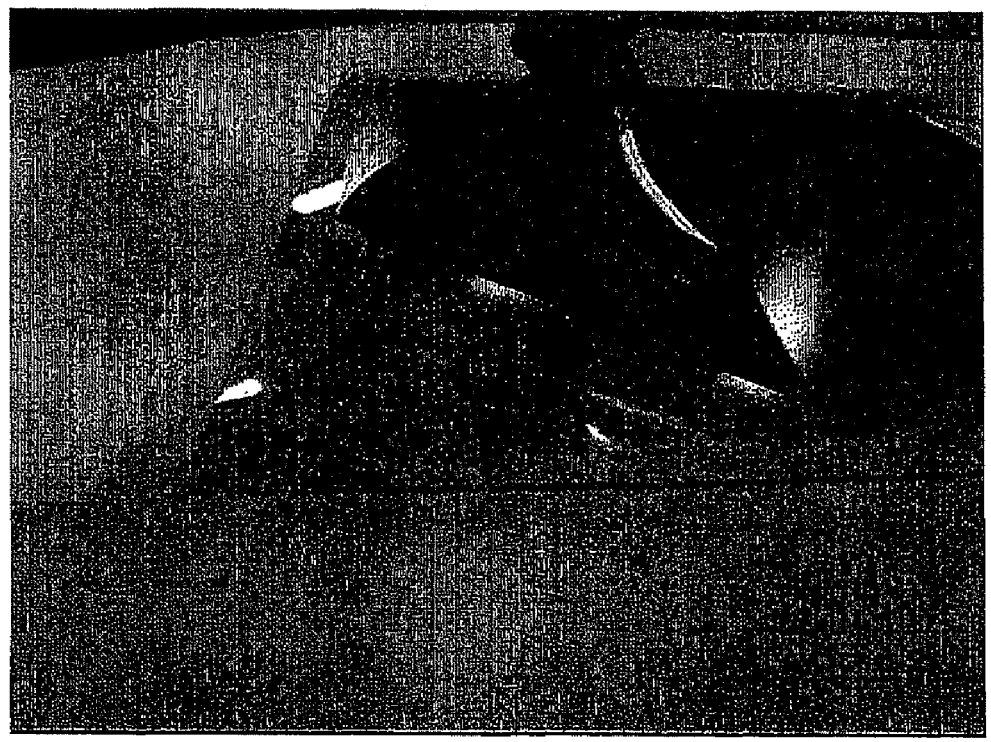

LAMINATED FILM

TECHNICAL FIELD

The invention relates to laminated film having a polarizing plate, a retardation film, and a pressure-sensitive adhesive layer.

BACKGROUND ART

Liquid crystal displays are attracting attention because of their features such as slimness, lightweight and low power consumption and widely used in portable equipment such as cellular phones and watches, office automation equipment such as personal computer monitors and notebook computers, domestic electrical equipment such as video cameras and liquid crystal televisions, and so on. Laminated films including laminate of retardation films and any of various polarizing plates are used in conventional Liquid crystal displays.

For example, a patent document 1 listed below discloses that a liquid crystal display which has a polarizing plate and a retardation film having a refractive index ellipsoid satisfying the relation nx>nz>ny placed on one side of an in-plane switching (IPS) liquid crystal cell, has improved contrast ratio in oblique directions.

However, liquid crystal displays produced with a conventional laminated film cause a problem. For example, leakage of light or significant changes in color (also referred to as a large amount of color shift) occur depending on the viewing direction, when a black image displayed on a screen is viewed from oblique directions, or optical unevenness is obtained, when backlight is allowed to run for certain hours.

Such a laminated film is generally bonded to a liquid crystal cell with an interposed pressure-sensitive adhesive layer. However, a conventional laminated film causes a problem in which the laminated film is difficult to separate from a liquid crystal cell, or a certain component of the laminated film (such as a retardation film or a pressure-sensitive adhesive layer) is left on the surface of a liquid crystal cell after the process of peeling the laminated film. In general, liquid crystal display undergo inspection before they are shipped. As a result of the inspection, if the laminated film itself is defective or if there is foreign matter between the laminated film and the liquid crystal cell, the laminated film will be separated such that the liquid crystal cell can be recycled (or reworked). Ideally, the laminated film should be bonded to the liquid crystal cell such that peeling or bubbles can be prevented even in a high-temperature, high-humidity environment, while the laminated film should be easily separable from the liquid crystal cell such that the liquid crystal cell can be recycled without causing damage or a change in cell gap. In conventional technologies, it has been difficult to satisfy such conflicting features at the same time. Thus, there have been demands for liquid crystal display panels in which such problems are overcome.

Patent Literature 1: Japanese Patent Application Laid-Open (JP-A) No. 11-305217

The invention has been made in order to solve the problems, and it is an object of the invention to provide a laminated film which may improve the display uniformity in liquid crystal display, and a laminated film which may have both good adhesion to a liquid crystal cell and easy peelability.

As a result of investigations for solving the problems, the inventors have found that the objects can be achieved with the laminated film described below, and have completed the invention.

In an aspect of the invention, a laminated film includes: a polarizing plate; a retardation film; and a first pressure-sensitive adhesive layer, provided in this order. The polarizing plate includes: a polarizer; a first protective layer placed on a side of the polarizer where the retardation film is provided; and a second protective layer placed on another side of the polarizer which is opposite to the side where the retardation film is provided. The retardation film is a stretched film which includes a norbornene resin. The first pressure-sensitive adhesive layer includes a pressure-sensitive adhesive that may be produced by crosslinking a composition which includes a (meth)acrylate (co)polymer and a crosslinking agent comprising a peroxide as a main component.

In a preferred embodiment of the invention, the first protective layer and/or the second protective layer is a polymer film comprising a cellulose resin.

In a preferred embodiment of the invention, the first protective layer is substantially optically isotropic.

In a preferred embodiment of the invention, the first protective layer has a refractive index ellipsoid satisfying the relation nx≈nz>ny, wherein nx is a refractive index in a slow axis direction, ny is a refractive index in a fast axis direction, and nz is a refractive index in a thickness direction;

In a preferred embodiment of the invention, the retardation film has a refractive index ellipsoid satisfying the relation nx>nz>ny, wherein nx is a refractive index in a slow axis direction, ny is a refractive index in a fast axis direction, and nz is a refractive index in a thickness direction;

In a preferred embodiment of the invention, the retardation film has an in-plane retardation (Re[590]) of 80 nm to 350 nm that is measured at 23° C. and a light wavelength of 590 nm.

In a preferred embodiment of the invention, the retardation film has an Nz coefficient of 0.1 to 0.7, wherein the Nz coefficient is calculated from the formula: Rth[590]/Re[590], wherein Re[590] is an in-plane retardation measured at 23° C. and a light wavelength of 590 nm, and Rth[590] is a retardation in a thickness direction that is measured at 23° C. and a light wavelength of 590 nm.

In a preferred embodiment of the invention, the retardation film has an absolute value of photoelastic coefficient of $1 \times 10^{-12}$ to $10 \times 10^{-12}$ that is measured at 23° C. and a light wavelength of 590 nm.

In a preferred embodiment of the invention, the first pressure-sensitive adhesive layer has an adhesive force ($F_A$) of 2 N/25 mm to 10 N/25 mm at 23° C. to a glass plate, wherein the adhesive force is measured by a process that includes pressing a laminated film with a width of 25 mm against a glass plate by one reciprocation of a 2 kg roller to bond the laminated film to the glass plate, aging the laminate at 23° C. for one hour, and then measuring an adhesive strength when the laminated film is peeled in a 90-degree direction at a rate of 300 mm/minute, wherein the adhesive strength is determined as the adhesive force.

In a preferred embodiment of the invention, the first pressure-sensitive adhesive layer has an anchoring force ($F_B$) of 10 N/25 mm to 40 N/25 mm at 23° C. to the retardation film, wherein the anchoring force is measured by a process that includes pressing a laminate of the pressure-sensitive adhesive layer and the retardation film each with a width of 25 mm against the surface of an indium tin oxide vapor-deposited onto a polyethylene terephthalate film by one reciprocation of a 2 kg roller to bond the laminate to the polyethylene terephthalate film, aging the laminate at 23° C. for one hour, and then measuring an adhesive strength when the polyethylene terephthalate film is peeled together with the pressure-sensitive adhesive layer in a 180-degree direction at a rate of 300 mm/minute, wherein the adhesive strength is determined as the anchoring force.

In a preferred embodiment of the invention, there is a difference ($F_B-F_A$) of 5 N/25 mm or more between the anchoring force ($F_B$) of the pressure-sensitive adhesive layer at 23° C. to the retardation film and the adhesive force ($F_A$) of the pressure-sensitive adhesive layer at 23° C. to a glass plate. The anchoring force is measured by a process that includes pressing a laminate of the pressure-sensitive adhesive layer and the retardation film each with a width of 25 mm against the surface of an indium tin oxide vapor-deposited onto a polyethylene terephthalate film by one reciprocation of a 2 kg roller to bond the laminate to the polyethylene terephthalate film, aging the laminate at 23° C. for one hour, and then measuring an adhesive strength when the polyethylene terephthalate film is peeled together with the pressure-sensitive adhesive layer in a 180-degree direction at a rate of 300 mm/minute. The adhesive strength is determined as the anchoring force, and the adhesive force is measured by a process that includes pressing a laminated film with a width of 25 mm against a glass plate by one reciprocation of a 2 kg roller to bond the laminate to the glass plate, aging the laminate at 23° C. for one hour, and then measuring an adhesive strength when the laminated film is peeled in a 90-degree direction at a rate of 300 mm/minute, wherein the adhesive strength is determined as the adhesive force.

In a preferred embodiment of the invention, the (meth)acrylate (co)polymer is a copolymer of a (meth)acrylate monomer having a straight or branched alkyl group of 1 to 8 carbon atoms and another (meth)acrylate monomer having a straight or branched alkyl group of 1 to 8 carbon atoms in which at least one hydrogen atom is replaced with a hydroxyl group.

In a preferred embodiment of the invention, the crosslinking agent including the peroxide as a main component has a content of 0.01 to 1.0 part by weight, base on 100 parts by weight of the (meth)acrylate (co)polymer.

In a preferred embodiment of the invention, the first pressure-sensitive adhesive layer includes: a pressure-sensitive adhesive that may be produced by crosslinking a composition comprising a (meth)acrylate (co)polymer; and an isocyanate group-containing compound, a silane coupling agent, wherein a crosslinking agent comprising a peroxide as a main component, the isocyanate group-containing compound has a content of 0.005 to 1.0 part by weight, based on 100 parts by weight of the (meth)acrylate (co)polymer, and the silane coupling agent has a content of 0.001 to 2.0 parts by weight, based on 100 parts by weight of the (meth)acrylate (co)polymer.

In a preferred embodiment of the invention, the pressure-sensitive adhesive has a glass transition temperature (Tg) of −70° C. to −10° C.

In a preferred embodiment of the invention, the pressure-sensitive adhesive has a moisture content of 1.0% or less.

In a preferred embodiment of the invention, the laminated film further includes a second pressure-sensitive adhesive layer between the polarizing plate and the retardation film, wherein the second pressure-sensitive adhesive layer includes a pressure-sensitive adhesive that may be produced by crosslinking a composition comprising a (meth)acrylate (co) polymer, a silane coupling agent, and a crosslinking agent comprising an isocyanate group-containing compound as a main component.

A liquid crystal display panel including the laminated film described above and liquid crystal cell is provided in one aspect of the invention.

A liquid crystal display is provided in another aspect of the invention. The liquid display includes the liquid crystal display panel described above.

EFFECTS OF THE INVENTION

The laminated film of the invention, has a stretched film comprising a norbornene resin as a retardation film and thus can form a liquid crystal display that can resist distortion-induced optical unevenness and provide a high level of display uniformity. When the retardation film has a refractive index ellipsoid satisfying the relation nx≧nz>ny, amounts of leakage of light in oblique directions and amount of color shift in the liquid crystal display are significantly smaller than those in conventional liquid crystal displays. The laminated film of the invention also uses a pressure-sensitive adhesive that may be produced by crosslinking a specific composition, and thus the pressure-sensitive adhesive can be strongly bonded to the retardation film. In such a liquid crystal display, peeling from a substrate of the liquid crystal cell (glass substrate) or bubbles can be prevented even in a high-temperature, high-humidity environment can provide a practically sufficient level of adhesive force and adhesion time. On the other hand, when the laminated film is peeled off and the liquid crystal cell is recycled, neither pressure-sensitive adhesive layer nor retardation film is left on the surface of the liquid crystal cell, and each optical film can be separated and removed by a small force. Thus, the productivity of the liquid crystal display can be significantly increased with no change in the cell gap of the liquid crystal cell or no damage to the substrate.

BRIEF DESCRIPTION OF THE DRAWINGS

FIG. 1 is a schematic cross-sectional view of a laminated film according to a preferred embodiment of the invention.

FIG. 2 is a schematic diagram showing the concept of a typical process for manufacturing a polarizer for use in the invention.

FIG. 3 is a schematic diagram showing the concept of a typical process for manufacturing a retardation film for use in the invention.

FIG. 4 is a schematic diagram showing the concept of a typical process for manufacturing a first pressure-sensitive adhesive layer for use in the invention.

FIG. 5 is a schematic cross-sectional view of a laminated film according to an embodiment of the invention.

FIG. 6 is a schematic cross-sectional view of a liquid crystal display panel according to a preferred embodiment of the invention.

FIG. 7 is a schematic cross-sectional view of a liquid crystal display according to a preferred embodiment of the invention.

FIG. 8 is a graph showing the relationship between the in-plane retardation (Re[590]) and the Nz coefficient of each of the retardation films obtained in Reference Examples 1 to 12.

FIG. 9 is a graph showing the relationship between the in-plane retardation (Re[590]) and the thickness direction retardation (Rth[590]) of each of the retardation films obtained in Reference Examples 1 to 12.

FIG. 10 is a graph showing Y values at a polar angle of 600 along azimuth angles of 0° to 360° with respect to the liquid crystal displays of Example 3 and Comparative Example 3.

FIG. 11 is a graph showing Δa*b* values at a polar angle of 60° along azimuth angles of 0° to 360° with respect to the liquid crystal displays of Example 3 and Comparative Example 3.

FIG. 12 is a photograph of the surface of a glass plate after the process of peeling the laminated film of Example 4.

FIG. 13 is a photograph of the surface of a glass plate after the process of peeling the laminated film of Comparative Example 4.

DESCRIPTION OF REFERENCE MARKS

In the drawings, reference numeral 10 represents a laminated film, 20 a polarizing plate, 21 a polarizing plate, 22 a first protective layer, 23 a second protective layer, 30 a retardation film, 41 a first pressure-sensitive adhesive layer, 42 a second pressure-sensitive adhesive layer, 50 a liquid crystal cell, 51 and 51' substrates, 52 a liquid crystal layer, 100 a liquid crystal display panel, 80 a backlight unit, 81 a backlight, 82 a reflecting film, 83 a diffusing plate, 84 a prism sheet, 85 a brightness enhancement film, 200 a liquid crystal display, 300 a feeding part, 310 an aqueous iodine solution bath, 320 an aqueous solution bath containing boric acid and potassium iodide, 330 an aqueous potassium iodide-containing solution bath, 340 drying means, 350 a polarizer, 360 a winding part, 401, 403 and 405 feeding parts, 414, 416 and 419 winding parts, 404 and 406 shrinkable films, 407 and 408 laminating rolls, 409 heating means, 501 and 506 feeding parts, 503 a coater, 504 temperature control means, 507 and 508 laminating rolls, and 510 a winding part.

BEST MODE FOR CARRYING OUT THE INVENTION

A. Outline of the Laminated Film

FIG. 1 is a schematic cross-sectional view of a laminated film according to a preferred embodiment of the invention. It should be noted that the length, width and thickness of each component in FIG. 1 are not shown in a true ratio for convenience of easy reference. This laminated film 10 includes at least a polarizing plate 20, a retardation film 30, and a first pressure-sensitive adhesive layer 41, provided in this order. The polarizing plate 20 includes a polarizer 21, a first protective layer 22 placed on a side of the polarizer 21 where the retardation film 30 is provided, and a second protective layer 23 placed on another side of the polarizer 21 which is opposite to the side where the retardation film 30 is provided. The retardation film 30 is a stretched film which includes a norbornene resin. The first pressure-sensitive adhesive layer 41 includes a pressure-sensitive adhesive that may be produced by crosslinking a composition which includes a (meth)acrylate (co)polymer and a crosslinking agent comprising a peroxide as a main component. When used in liquid crystal displays, such a laminated film can resist distortion-induced optical unevenness and provide a high level of display uniformity. Even in a high-temperature, high-humidity environment, such a laminated film does not cause peeling or bubbles and can provide a practically sufficient level of adhesive force and adhesion time. On the other hand, such a laminated film is characterized by having a high level of easy peelability (also referred to as reworkability) when separated from a liquid crystal cell.

In an embodiment of the invention, any adhesive layers (not shown) can be provided between the polarizer 21 and the first protective layer 22, between the polarizer 21 and the second protective layer 23. As used herein, the term "adhesive layer" is intended to include any layer capable of bonding the surfaces of adjacent optical components at a practically sufficient level of adhesive strength and adhesion time. For example, the adhesive layer may be a layer of an adhesive agent, a pressure-sensitive adhesive layer, an anchor coating layer, or the like. The adhesive layer may be a multilayer structure including an anchor coating layer formed on the surface of the adherend and an adhesive or pressure-sensitive adhesive layer formed thereon. The adhesive layer may also be a subvisible thin layer (also called hair line).

In practical, a release liner (not shown) may be provided on a side of the first pressure-sensitive adhesive layer 41 which is opposite to the side where the retardation film 30 is provided. A surface protective film may also be provided on a side of the second protective layer 23 which is opposite to the side where the polarizer 21 is provided. The release liner and the surface protective film are used in order to prevent the laminated film from being soiled or scratched during a manufacturing process or handling of the laminated film. The release liner and the surface protective film, thus be peeled off before the laminated film is practically used.

The laminated film preferably has a thickness of 100 μm to 600 μm, more preferably of 200 μm to 400 μm. Setting the thickness of the first protective layer in the above range allows a production of a polarizing plate with a high level of mechanical strength.

It will be understood that the laminated film of the invention is not limited to the embodiments described above, and, for example, any other optical component may be placed between the respective components shown in FIG. 1. The thickness of the laminated film also includes the thickness of the components above and the other components such as surface treatment layer formed on the second protective layer.

B. Polarizing Plate

Referring to FIG. 1, the polarizing plate 20 for use in the invention includes a polarizer 21, a first protective layer 22 placed on a side of the polarizer where the retardation film is provided, and a second protective layer 23 placed on another side of the polarizer which is opposite to the side where the retardation film is provided. In an embodiment of the invention, the first protective layer 22 and the second protective layer 23 may be the same or different.

The first polarizing plate 20 preferably includes adhesive layers (not shown) that are provided between the polarizer 21 and the first protective layer 22 and between the polarizer 21 and the second protective layer 23, respectively, to bond the respective protective layers to the polarizer. The polarizer sandwiched between the protective layers as described above can form a polarizing plate with a high level of mechanical strength. In addition, the polarizer can be prevented from expanding or shrinking even in a high-temperature, high-humidity environment, so that the resulting polarizing plate can have a high level of optical properties.

The polarizing plate preferably has a thickness of 45 μm to 250 μm, more preferably of 70 μm to 220 μm. The polarizing plate with a thickness in the above range can have a high level of mechanical strength.

The transmittance (also referred to as single-piece transmittance) of the polarizing plate is preferably 40% or more, more preferably 42% or more, when measured at 23° C. and a light wavelength of 550 nm. The single-piece transmittance has a theoretical upper limit of 50% and a possible upper limit of 46%.

The polarizing plate preferably has a degree of polarization of 99.8% or more, more preferably of 99.9% or more. The degree of polarization has a theoretical upper limit of 100%. If the single-piece transmittance and the degree of polarization are each set in the above range, liquid crystal displays with low level of light leakage in the normal direction (with a high level of contrast ratio, as a result) can be obtained.

According to the National Bureau of Standards (NBS), the hue value a (single-piece a value) of the polarizing plate is preferably −2.0 or more, more preferably −1.8 or more. The value a is ideally zero. According to the National Bureau of Standards (NBS), the hue value b (single-piece b value) of the polarizing plate is preferably 4.2 or less, more preferably 4.0 or less. The value b is ideally zero. If the values a and b of the polarizing plate is close to zero, liquid crystal displays capable of displaying images in bright colors can be obtained.

The single-piece transmittance, the degree of polarization and the hue may be measured using a spectrophotometer (DOT-3 (product name) manufactured by Murakami Color Research Laboratory Co., Ltd.). Specifically, the degree of polarization may be determined by a measurement method that includes measuring the parallel transmittance ($H_0$) and crossed transmittance ($H_{90}$) of the polarizing plate and calculating the degree of polarization from the formula: degree of polarization (%)=$\{(H_0-H_{90})/(H_0+H_{90})\}^{1/2} \times 100$. The parallel transmittance ($H_0$) is the transmittance value of a parallel laminated polarizing plate that is produced by laminating two pieces of the same polarizing plate in such a manner that their absorption axes are parallel to each other. The crossed transmittance ($H_{90}$) is the transmittance value of a cross laminated polarizing plate that is produced by laminating two pieces of the same polarizing plate in such a manner that their absorption axes are orthogonal to each other. These transmittances above are Y values which have undergone luminosity correction in the two-degree visual field (C illuminant) according to JIS Z 8701 (1982).

B-1. Polarizer

Any appropriate polarizer capable of converting natural light or polarized light into linearly polarized light may be used as the polarizer described above. The polarizer is preferably an iodine- or dichroic dye-containing stretched film mainly composed of a polyvinyl alcohol resin. As used herein, the term "stretched film" refers to a polymer film that is produced by applying a tension to an unstretched film at an appropriate temperature in such a manner that the orientation of the molecules is increased along the tensile direction.

The polarizer may have any appropriate thickness, which is chosen depending on the purpose. The polarizer preferably has a thickness of 5 μm to 50 μm, more preferably of 10 μm to 30 μm.

The polyvinyl alcohol resin may be produced by polymerizing a vinyl ester monomer and saponifying the resulting vinyl ester polymer. Examples of the vinyl ester monomer include vinyl formate, vinyl acetate, vinyl propionate, vinyl valerate, vinyl laurate, vinyl stearate, vinyl benzoate, vinyl pivalate, and vinyl versatate.

The polyvinyl alcohol resin preferably has a degree of saponification of 95.0% by mole to 99.9% by mole. The degree of saponification may be determined according to JIS K 6726 (1994). A polarizer with a high level of durability can be obtained using a polyvinyl alcohol resin with a degree of saponification in the above range.

The polyvinyl alcohol resin may have any appropriate average degree of polymerization, which is chosen depending on the purpose. The average degree of polymerization is preferably from 1200 to 3600. The average degree of polymerization may be determined according to JIS K 6726 (1994).

Any appropriate forming method may be used to produce a polymer film mainly composed of the polyvinyl alcohol resin. For example, such a forming method is described in Example 1 of JP-A No. 2000-315144.

The polymer film mainly composed of the polyvinyl alcohol resin preferably contains a polyhydric alcohol as a plasticizer. The polyhydric alcohol may be used to further increase the stretchability and dyeability of the polarizer. Examples of the polyhydric alcohol include ethylene glycol, glycerin, propylene glycol, diethylene glycol, triethylene glycol, tetraethylene glycol, and trimethylolpropane. One or more of these polyhydric alcohols may be used singly or in any combination. The content of the polyhydric alcohol is preferably more than 0 and not more than 30 parts by weight, based on 100 parts by weight of the total solids of the polyvinyl alcohol resin.

The polymer film mainly composed of the polyvinyl alcohol resin may further contain a surfactant. The surfactant may be used to further increase the stretchability and dyeability of the polarizer. The surfactant is preferably a nonionic surfactant. Examples of the nonionic surfactant include lauric acid diethanolamide, coconut oil fatty acid diethanolamide, coconut oil fatty acid monoethanolamide, lauric acid monoisopropanolamide, and oleic acid monoisopropanolamide. The content of the surfactant is preferably more than 0 and not more than 5 parts by weight, based on 100 parts by weight of the polyvinyl alcohol resin.

Any appropriate dichroic substance may be used as the dichroic dye. As used herein, the term "dichroic" refers to optical anisotropy in which two directions including an optical axis direction and another direction perpendicular thereto differ in light absorption. Examples of the dichroic dye include Red BR, Red LR, Red R, Pink LB, Rubin BL, Bordeaux GS, Sky Blue LG, Lemon Yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo Red, Brilliant Violet BK, Supra Blue G, Supra Blue GL, Supra Orange GL, Direct Sky Blue, Direct Fast Orange S, and Fast Black.

The polymer film mainly composed of the polyvinyl alcohol resin for use in the invention may be a commercially available film itself. Examples of such a commercially available polymer film mainly composed of a polyvinyl alcohol resin are Kuraray Vinylon Film (trade name) manufactured by Kuraray Co., Ltd., Tohcello Vinylon Film (trade name) manufactured by Tohcello Co., Ltd. and Nichigo Vinylon Film (trade name) manufactured by Nippon Synthetic Chemical Industry Co., Ltd.

A typical method for producing the polarizer is described with reference to FIG. 4. FIG. 4 is a schematic diagram illustrating the concept of a typical process for producing the polarizer for use in the invention. For example, a polymer film 301 mainly composed of a polyvinyl alcohol resin is subjected to a swelling process and a dyeing process, while it is fed from a feeder 300 and immersed in an aqueous iodine solution bath 310 and undergoes a tension in the machine direction of the film between rolls 311 and 312 in different circumferential velocities. The film is then subjected to a crosslinking process, while it is immersed in an aqueous solution bath 320 containing boric acid and potassium iodide and undergoes a tension in the machine direction of the film between rolls 321 and 322 in different circumferential velocities. The crosslinked film is immersed in an aqueous solution bath 330 containing potassium iodide and subjected to washing with water by means of rolls 331 and 332. The film washed with water is dried by drying means 340 so that its moisture content is typically adjusted to 10% to 30% and wound on a winding part 360. Through these processes, the polymer film mainly composed of the polyvinyl alcohol resin is stretched to 5 to 7 times its original length and results in a polarizer 350.

B-2. First Protective Layer

Referring to FIG. 1, the first protective layer 22 is placed between the polarizer 21 and the retardation film 30. The first protective layer is used in combination with the second protective layer in order to prevent the polarizer from contracting or expanding and from being deteriorated by ultraviolet rays.

The first protective layer may have any appropriate thickness, which is chosen depending on the purpose. The protective layer preferably has a thickness of 10 µm to 100 µm, more preferably of 20 µm to 100 µm. Setting the thickness of the first protective layer in the above range allows a production of a polarizing plate with a high level of mechanical strength and durability.

The first protective layer preferably has a transmittance of 90% or more, when measured at a light wavelength of 590 nm and 23° C. The transmittance has a theoretical upper limit of 100% and a possible upper limit of 96%.

The absolute value of the photoelastic coefficient (C[590] ($m^2$/N)) of the first protective layer is preferably from $1\times10^{-12}$ to $100\times10^{-12}$, more preferably from $1\times10^{-12}$ to $60\times10^{-12}$. In the above range of the absolute value of the photoelastic coefficient, a polarizing plate that resists distortion-induced optical unevenness can be obtained.

The first protective layer used in the liquid crystal display panel of the invention is placed between the polarizer and the liquid crystal cell, and in some cases, therefore, the optical properties of the first protective layer has an effect on the display characteristics of the liquid crystal display. Thus, the first protective layer to be used preferably has an appropriate retardation value.

In a preferred embodiment of the invention, the first protective layer is substantially optically isotropic. Herein, the case where it is substantially optically isotropic is intended to include the case where the in-plane retardation (Re[590]) is less than 10 nm and the absolute value of the retardation in the thickness direction (|Rth[590]|) is less than 10 nm.

As used herein, Re[590] represents an in-plane retardation measured at a light wavelength of 590 nm and 23° C. When the measurement object is a simple film, the term "in-plane retardation," as used herein, means retardation in the plane of the film, and when the measurement object is a laminate, the term "in-plane retardation," as used herein, means retardation in the plane of the whole of the laminate. Re[590] may be calculated from the formula: Re[590]=(nx−ny)d, wherein nx and ny represent refractive indices in the slow axis direction and in the fast axis direction, respectively, at a wavelength of 590 nm, and d (nm) represents the thickness of the measurement object. The slow axis corresponds to a direction in which the in-plane refractive index is maximum.

When the first protective layer is substantially optically isotropic, the Re[590] of the first protective layer should be less than 10 nm, preferably 8 nm or less, more preferably 5 nm or less. In the above range of Re[590], a liquid crystal display with very low level of color shift and light leakage in oblique directions can be obtained, when the first protective layer is used in combination with a retardation film having the optical properties described later.

As used herein, Rth[590] represents retardation in the thickness direction that is measured at a light wavelength of 590 nm and 23° C. When the measurement object is a simple film, the term "retardation in the thickness direction," as used herein, means a retardation in the direction of the thickness of the film, and when the measurement object is a laminate, the term "retardation in the thickness direction," as used herein, means a retardation in the direction of the thickness of the whole of the laminate. Rth[590] may be calculated from the formula: Rth[590]=(nx−nz)d, wherein nx and nz represent refractive indices in the slow axis direction and in the thickness direction, respectively, at a wavelength of 590 nm, and d (nm) represents the thickness of the measurement object. The slow axis corresponds to a direction in which the in-plane refractive index is maximum.

When the first protective layer is substantially optically isotropic, the absolute value (|Rth[590]|) of the Rth[590] of the first protective layer should be less than 10 nm, preferably 8 nm or less, more preferably 5 nm or less. In the above range of |Rth[590]|, a liquid crystal display with very low level of color shift and light leakage in oblique directions can be obtained, when the first protective layer is used in combination with a retardation film having the optical properties described later.

Re[590] and Rth[590] may be measured using KOBRA21-ADH (trade name) manufactured by Oji Scientific Instruments. From the formulae (i), (ii) and (iii) below, nx, ny and nz may be obtained by computer calculation using the in-plane retardation (Re) at 23° C. and a wavelength of 590 nm, a retardation (R40) measured with the slow axis inclined by 40 degrees, the thickness (d) of the measurement object, and the average refractive index (n0) of the measurement object, and then Rth may be calculated from the formula (iv) below.

$$Re = (nx-ny)d \tag{i}$$

$$R40 = (nx-ny')d/\cos(\phi) \tag{ii}$$

$$(nx+ny+nz)/3 = n0 \tag{iii}$$

$$Rth = (nx-nz)d \tag{iv}$$

wherein φ and ny' are expressed by the formulae (v) and (vi) below, respectively.

$$\phi = \sin^{-1}[\sin(40°)/n0] \tag{v}$$

$$ny' = nynz/[ny^2 \sin^2(\phi) + nz^2 \cos^2(\phi)]^{1/2} \tag{vi}$$

In another embodiment of the invention, the refractive index ellipsoid of the first protective layer has the relation nx≈ny>nz, wherein nx is a refractive index in its slow axis direction, ny is a refractive index in its fast axis direction, and nz is a refractive index in its thickness direction. The protective layer whose refractive index ellipsoid has the relation nx≈ny>nz ideally has an optical axis in the normal direction. Herein, nx≈ny means not only that nx is completely equal to ny but also that nx is substantially equal to ny. Herein, the case where nx is substantially equal to ny is intended to include the case where the in-plane retardation (Re[590]) is less than 10 nm.

When the relation of the refractive index ellipsoid nx≈ny>nz is expressed using Re[590] and Rth[590], the first protective layer satisfies the formula (1): Re[590]<10 nm and the formula (2) 10 nm≦Rth[590], wherein Re[590] is the in-plane retardation at 23° C. and a wavelength of 590 nm, and Rth[590] is the retardation in the thickness direction at 23° C. and a wavelength of 590 nm.

When the refractive index ellipsoid of the first protective layer has the relation nx≈ny>nz, the Re[590] of the first protective layer should be less than 10 nm, preferably 8 nm or less, more preferably 5 nm or less. In the above range of Re[590], a liquid crystal display with very low level of color shift and light leakage in oblique directions can be obtained, when the first protective layer is used in combination with a retardation film having the optical properties described later.

When the refractive index ellipsoid of the first protective layer has the relation nx≈ny>nz, the Rth[590] of the first protective layer should be 10 nm or more, preferably from 20 nm to 100 nm, more preferably from 30 nm to 80 nm. In the above range of Rth[590], a liquid crystal display with very low level of color shift and light leakage in oblique directions can be obtained, when the first protective layer is used in combination with a retardation film having the optical properties described later.

Any appropriate material may be used to form the first protective layer. Preferably, the first protective layer is formed of a polymer film containing a cellulose resin. Cellulose resins have good adhesion to the polarizer and thus can form a polarizing plate with each component prevented from peeling even in a high-temperature, high-humidity environment.

Any appropriate cellulose resin may be used as the cellulose resin described above. The cellulose resin is preferably an organic acid ester or mixed organic acid ester of cellulose in which the hydroxyl groups of the cellulose are partially or entirely replaced with an acetyl group, a propionyl group and/or a butyl group. Examples of the organic acid ester of cellulose include cellulose acetate, cellulose propionate and cellulose butyrate. Examples of the mixed organic acid ester of cellulose include cellulose acetate propionate and cellulose acetate butyrate. For example, the cellulose resin may be obtained by the method described in Paragraphs [0040] to [0041] of JP-A No. 2001-188128.

A commercially available product may be used as the cellulose resin without modification. Alternatively, a commercially available resin may be subjected to any appropriate polymer modification and then used. Examples of the polymer modification include copolymerization, crosslinking and modification of molecular end, stereoregularity or the like. Examples of commercially available cellulose resins include cellulose acetate propionate resins manufactured by Daicel Finechem Ltd., cellulose acetate manufactured by Eastman Chemical Company, cellulose butyrate manufactured by Eastman Chemical Company, and cellulose acetate propionate manufactured by Eastman Chemical Company.

The cellulose resin preferably has a weight average molecular weight (Mw) of 20,000 to 1,000,000, more preferably of 25,000 to 800,000, when measured by a gel permeation chromatography (GPC) method using tetrahydrofuran as a solvent. Specifically, the above weight average molecular weights are values measured by the method described in the section of EXAMPLES. In the above range of weight average molecular weight, the resulting product can have a high level of mechanical strength, solubility, formability, and casting workability.

The cellulose resin preferably has a glass transition temperature (Tg) of 110° C. to 185° C. If the Tg is 110° C. or higher, films with good thermal stability can be easily obtained. If the Tg is 185° C. or lower, good formability can be obtained. The glass transition temperature (Tg) may be determined by DSC method according to JIS K 7121.

Any appropriate forming method may be used to produce the cellulose resin-containing polymer film. Examples of forming methods include compression molding, transfer molding, injection molding, extrusion molding, blow molding, powder molding, FRP molding, and solvent casting. The forming method is preferably a solvent casting method, because it can form a polymer film with a high level of smoothness and optical uniformity.

Specifically, the solvent casting method may include deaerating a thick solution (a dope) prepared by dissolving, in a solvent, a resin composition containing a resin as a main component, an additive and so on, uniformly casting the thick solution into a sheet on the surface of an endless stainless steel belt or a rotating drum, and vaporizing the solvent to form a film. Appropriate conditions may be chosen for the film forming process, depending on the purpose.

The cellulose resin-containing polymer film may further contain any appropriate additive. Examples of such an additive include a plasticizer, a heat stabilizer, a light stabilizer, a lubricant, an antioxidant, an ultraviolet absorbing agent, a flame retardant, a colorant, an antistatic agent, a compatibilizing agent, a crosslinking agent, and a thickener. The content of the additive is preferably more than 0 and not more than 20 parts by weight, based on 100 parts by weight of the cellulose resin.

A commercially available film may be used as the first protective layer without modification. Alternatively, a commercially available film may be subjected to a secondary process such as stretching and/or shrinking and then used. Examples of the commercially available cellulose resin-containing polymer film include FUJITAC series manufactured by Fuji Photo Film Co., Ltd. (such as FUJITAC ZRF80S, TD80UF and TDY-80UL (trade names)) and KC8UX2M (trade name) manufactured by Konica Minolta Opto, Inc.

B-3. Second Protective Layer

Referring to FIG. 1, the second protective layer 23 is placed on one side of the polarizer 21, which was opposite to the side where the first protective layer 22 is provided. The second protective layer is used in combination with the first protective layer in order to prevent the polarizer from contracting or expanding and from being deteriorated by ultraviolet rays.

Any appropriate layer may be used as the second protective layer. A layer having a thickness, a transmittance and a photoelastic coefficient each in the range described in the section C-1 is preferably used as the second protective layer.

Any appropriate material may be used to form the second protective layer. Preferably, the second protective layer is formed of a polymer film containing a cellulose resin. Examples of the cellulose resin-containing polymer film that may be used are preferably the same as described in the section C-2.

When used in the liquid crystal display panel of the invention, the second protective layer is placed outside the liquid crystal cell (on the viewer or backlight side). For example, the second protective layer may be placed so as to form the outermost surface on the viewer side in the first polarizing plate, or the second protective layer may be placed on an upper artificially-roughened part of a prism sheet in the second polarizing plate. Preferably, therefore, the second protective layer further includes a surface treatment layer on the outside (opposite to the side where the polarizer is provided).

Any appropriate treatment may be used to form the surface treatment layer, depending on the purpose. For example, the surface treatment layer may be formed by hard-coat treatment, antistatic treatment, anti-reflective treatment (also referred to as anti-reflection treatment), diffusing treatment (also referred to as antiglare treatment), or any other treatment. These surface treatment layers may be used to prevent the screen from being soiled or scratched or to prevent the displayed image from being made difficult to see by the reflection of room fluorescent light or sunlight on the screen. The surface treatment layer to be used is generally formed by bonding a treatment agent to the surface of a base film. The base film may also serve as the second protective layer. The surface treatment layer may also be a multilayer structure such as a laminate of an antistatic treatment layer and a hard coat treatment layer formed thereon.

A commercially available polymer film having a surface treatment layer may be used as the second protective layer without modification. Alternatively, a commercially available polymer film may be subjected to any surface treatment and then used. Examples of the commercially available polymer film with a diffusing treatment (antiglare treatment) layer include AG150, AGS1, AGS2, and AGT1 manufactured by Nitto Denko Corporation. Examples of the commercially available polymer film with an anti-reflective treatment (antreflection treatment) layer include ARS and ARC manufactured by Nitto Denko Corporation. Examples of the commercially available film with a hard coat treatment layer and an antistatic treatment layer include KC8UX-HA (trade name) manufactured by Konica Minolta Opto, Inc. Examples of the commercially available polymer film with an anti-reflection surface treatment layer include ReaLook series manufactured by NOF Corporation.

B-4. Adhesive Layers

In the polarizing plate, any appropriate adhesive, pressure-sensitive adhesive and/or anchor coating agent may be used for the adhesive layers that are provided to bond the first and second protective layers to the polarizer, respectively.

The adhesive layers may each have any appropriate thickness, which is chosen depending on the purpose. Preferably, the adhesive layers each have a thickness of 0.01 μm to 50 μm. If the adhesive layers each have a thickness in the above range, the bonded polarizer and protective layer can be free from peeling or separation so that practically sufficient strength and time of adhesion can be achieved.

A water-soluble adhesive mainly composed of a polyvinyl alcohol resin is preferably used as a material for forming the adhesive layer, because it has good adhesion to the polarizer and the protective layer and is highly workable, productive and economical. A commercially available water-soluble adhesive mainly composed of a polyvinyl alcohol resin may be used as it is for the adhesive layer or may be mixed with a solvent or an additive before use. Examples of the commercially available water-soluble adhesive mainly composed of a polyvinyl alcohol resin include Gosenol series manufactured by Nippon Synthetic Chemical Industry Co., Ltd. (such as Gosenol NH-18S, GH-18S and T-330 (trade names)) and Gosefimer series manufactured by Nippon Synthetic Chemical Industry Co., Ltd. (such as Gosefimer Z-100, Z-200 and Z-210 (trade names)).

A composition may be obtained by adding a crosslinking agent to the water-soluble adhesive and subjected to crosslinking to form the adhesive layer. Any appropriate crosslinking agent may be used as the above crosslinking agent. Examples of the crosslinking agent include amine compounds, aldehyde compounds, methylol compounds, epoxy compounds, isocyanate compounds, and multivalent metal salts. A commercially available product may be used as the crosslinking agent without modification. Examples of such a commercially available crosslinking agent include an amine compound manufactured by Mitsubishi Gas Chemical Company, Inc. (Methaxylenediamine (trade name)), an aldehyde compound manufactured by Nippon Synthetic Chemical Industry Co., Ltd. (Glyoxal (trade name)) and a methylol compound manufactured by Dainippon Ink and Chemicals, Incorporated (Watersol (trade name)).

C. Retardation Film

The retardation film for use in the invention is a norbornene resin-containing stretched film. The absolute value of the photoelastic coefficient of the norbornene resin is smaller than that of other resins. Therefore, the norbornene resin can form a retardation film that resists optical unevenness and fluctuations in the retardation value even when strains are caused by the expansion or contraction of the polarizer, so that a liquid crystal display panel and a liquid crystal display each with a high level of display uniformity can be obtained.

The refractive index ellipsoid of the retardation film preferably has the relationship nx>nz>ny. When the retardation film having such a relationship is placed on one or both sides of a liquid crystal cell in a liquid crystal display, light leakage and color shift in oblique directions can be significantly reduced. In general, a liquid crystal display in which two polarizing plates are placed on both sides of a liquid crystal cell such that the directions of their absorption axes are orthogonal to each other may cause light leakage in oblique directions. Specifically, when the long side of such a liquid crystal panel is defined as being in a direction of 0°, the amount of leakage of light tends to be maximum in oblique directions of 45° and 135°. When the retardation film having the above relationship of the refractive index ellipsoid is used in the laminated film of the invention, there can be provided liquid crystal displays in which light leakage is significantly reduced in oblique directions as compared with conventional liquid crystal displays.

When the relation of the refractive index ellipsoid nx>nz>ny is expressed using Re[590] and Rth[590], the retardation film satisfies the formula below.

$$10 \text{ nm} \leq Rth[590] < Re[590] \tag{3}$$

wherein Re[590] is the in-plane retardation measured at a light wavelength of 590 nm and 23° C., and Rth[590] is the retardation in the thickness direction measured at a light wavelength of 590 nm and 23° C.

Conventionally, no retardation film having the refractive index ellipsoid relation nx>nz>ny has been obtained yet using norbornene resin-containing stretched films. This is because it is more difficult to produce a retardation by stretching in norbornene resin-containing polymer films than in other resins and because norbornene resin-containing polymer films themselves are too brittle to be stretched. In addition, in order to make the refractive index (nz) in the film thickness direction larger than one (ny) of the in-plane refractive indices, relatively large stress has to be applied to films, which has been made the production of retardation films more difficult. According to the invention, retardation films having the relation nx>nz>ny are actually obtained using norbornene resin-containing stretched films by the production method using a specific shrinkable film as described later.

Referring to FIG. 1, the retardation film 30 is placed between the first pressure-sensitive adhesive layer 41 and the first protective layer 22 placed on one side of the polarizing plate 21. Preferably, the direction of the slow axis of the retardation film 30 is substantially parallel, substantially orthogonal, or substantially 45° to the direction of the absorption axis of the polarizer 21. More preferably, the direction of the slow axis of the retardation film 30 is substantially orthogonal to the direction of the absorption axis of the polarizer 21. Using the retardation film in the specific positional relation allows the production of a liquid crystal display in which light leakage and color shift are further reduced in oblique directions. As used herein, the term "substantially parallel" is intended to include the case where the angle between the direction of the slow axis of the retardation film 30 and the direction of the absorption axis of the polarizer 21 is 0°±2.0°, preferably 0°±1.0°, more preferably 0°±0.5°. As used herein, the term "substantially orthogonal" is intended to include the case where the angle between the direction of the slow axis of the retardation film 30 and the direction of the absorption axis of the polarizer 21 is 90°±2.0°, preferably 90°±1.0°, more preferably 90°±0.5°. As used herein, the term "substantially 45°" is intended to include the case where the angle between the direction of the slow axis of the retardation film 30 and the direction of the absorption axis of the polarizer is 45°±2.0°, preferably 45°±1.0°, more preferably 45°±0.5°. If the deviation from the ideal angle between the direction of the slow axis of the retardation film and the direction of the absorption axis of the polarizing plate (the deviation from 0°, 90°, or 45°) is smaller, a liquid crystal display with a higher contrast ratio in the normal and oblique directions can be obtained.

The retardation film may have any appropriate thickness, which is chosen depending on the purpose. Preferably, the retardation film has a thickness of 20 μm to 200 μm. If the thickness of the retardation film is set in the above range, a desired retardation value can be obtained, and the resulting retardation film can have a high level of mechanical strength and durability.

The retardation film preferably has a transmittance of 90% or more, when measured at a light wavelength of 590 nm and 23° C. The transmittance has a theoretical upper limit of 100% and a possible upper limit of 96%.

The absolute value of the photoelastic coefficient (C[590] ($m^2$/N)) of the retardation film is preferably from $1 \times 10^{-12}$ to $10 \times 10^{-12}$, more preferably from $1 \times 10^{-12}$ to $8 \times 10^{-12}$, particularly preferably from $1 \times 10^{-12}$ to $6 \times 10^{-12}$. In the above range of the absolute value of the photoelastic coefficient, a retardation film that resists distortion-induced optical unevenness can be obtained.

One or both sides of the retardation film for use in the invention may be subjected to surface modification treatment. The surface modification treatment may be performed by any appropriate method. For example, the surface modification treatment may be a dry process or a wet process. Examples of the dry process include discharge treatment such as corona treatment and glow discharge treatment, flame treatment, ozone treatment, UV-ozone treatment, ultraviolet treatment, and ionizing radiation treatment such as electron beam treatment. Surface modification treatment (dry process) suitable for the retardation film is preferably corona treatment. As used herein, the term "corona treatment" refers to a process that includes modifying the surface of a film by allowing the film to pass through a corona discharge field generated by applying high frequency/high voltage between a grounded dielectric roll and an insulated electrode and thus causing dielectric breakdown and ionization of the air between the electrodes.

Examples of the wet process include alkali treatment and anchor coating treatment. As used herein, the term "alkali treatment" refers to a process that includes modifying the surface of a film by immersing the film in an alkali treatment solution which is a solution of a basic substance in water or an organic solvent. The term "anchor coating treatment" refers to a process that includes previously applying an anchor coating agent to the surface of a laminated film in order to increase the adhesion between the film and the pressure-sensitive adhesive layer. Surface modification treatment (wet process) suitable for the retardation film is preferably anchor coating treatment. The anchor coating agent preferably includes a polymer containing an amino group in its molecule, particularly preferably includes polyethyleneimine.

C-1. Materials for Forming Retardation Film

Any appropriate norbornene resin may be used for the retardation film. Such a norbornene resin preferably has a high level of transparency, mechanical strength, thermal stability, and moisture blocking properties and preferably resists distortion-induced optical unevenness.

As used herein, the term "norbornene resin" refers to a (co)polymer or (co)polymers that are produced using a norbornene monomer having a norbornene ring as part or all of the starting material(s) (a monomer or monomers). As used herein, the term "(co)polymer" means a homopolymer or a copolymer.

The norbornene resin may be produced using, as a starting material, a norbornene monomer having a norbornene ring (in which a double bond is formed in a norbornane ring). The norbornene resin in a state of (co)polymer may have or may not have a norbornane ring in its constitutional unit(s). For example, the norbornene resin having a norbornane ring-containing constitutional unit in a state of (co)polymer may be produced using tetracyclo[4.4.1$^{2,5}$.1$^{7,10}$.0]deca-3-ene, 8-methyltetracyclo[4.4.1$^{2,5}$.1$^{7,10}$.0]deca-3-ene, 8-methoxycarbonyltetracyclo[4.4.1$^{2,5}$.17,10.0]deca-3-ene, or the like. For example, the norbornene resin having no norbornane ring in its constitutional unit in a state of (co)polymer may be produced using a monomer capable of forming a five-membered ring by cleavage. Examples of the monomer capable of forming a five-membered ring by cleavage include norbornene, dicyclopentadiene, 5-phenylnorbornene, and derivatives thereof. When the norbornene resin is a copolymer, it may be a random copolymer, a block copolymer or a graft copolymer, while its molecule may have any structural arrangement.

A commercially available product may be used as the norbornene resin without modification. Alternatively, a commercially available norbornene resin may be subjected to any appropriate polymer-modification before use. Examples of commercially available norbornene resins include ARTON series manufactured by JSR Corporation (such as ARTON FLZR50, ARTON FLZR70, ARTON FLZL100, ARTON F5023, ARTON FX4726, ARTON FX4727, ARTON D4531, and ARTON D4532 (trade names)), ZEONOR series manufactured by Nippon Zeon Co., Ltd. (such as ZEONOR750R, ZEONOR1020R, and ZEONOR 1600 (trade names)), APL series manufactured by Mitsui Chemicals, Inc. (such as APL8008T, APL6509T, APL6011T, APL6013T, APL6015T, and APL5014T (trade names)), and COC resin (TOPAS (trade name)) manufactured by TICONA.

Examples of the norbornene resin include (A) a resin of a hydrogenated ring-opening (co)polymer of a norbornene monomer and (B) a resin of an addition (co)polymer of a norbornene monomer. The ring-opening copolymer of the norbornene monomer is intended to include a resin of a hydrogenated ring-opening copolymer of one or more norbornene monomers, and an α-olefin, a cycloalkene and/or a non-conjugated diene. The resin of the addition copolymer of the norbornene monomer is intended to include a resin of an addition copolymer of one or more norbornene monomers, and an α-olefin, a cycloalkene and/or a non-conjugated diene. The norbornene resin is preferably (A) a resin of a hydrogenated ring-opening (co)polymer of a norbornene monomer, because such a resin has good formability and can be formed into a retardation film with a high retardation value by stretching at low draw ratios.

The resin of the hydrogenated ring-opening (co)polymer of the norbornene monomer may be prepared by a process including the steps of subjecting the norbornene monomer or the like to a metathesis reaction to form a ring-opening (co)polymer and then hydrogenating the ring-opening (co)polymer. Examples of such a process include the method described in "Development and Application Techniques of Optical Polymer Materials," published by NTS INC., 2003, pp. 103-111, and the methods described in Paragraphs [0059] to [0060] of JP-A No. 11-116780, Paragraphs [0035] to [0037] of JP-A No. 2001-350017, and Paragraph [0053] of JP-A No. 2005-008698. The resin of the addition (co)polymer of the norbornene monomer may be prepared by the method described in Example 1 of JP-A No. 61-292601.

The weight average molecular weight (Mw) of the norbornene resin is preferably from 20,000 to 500,000, more preferably from 30,000 to 200,000, in terms of the value measured by gel permeation chromatography (GPC) with a solvent of tetrahydrofuran. The weight average molecular weight may be measured by the method described in the section of EXAMPLES. If the norbornene resin has a weight average molecular weight in the above range, products with a high level of mechanical strength, solubility, formability, or casting operability can be produced.

The norbornene resin preferably has a glass transition temperature (Tg) of 110° C. to 185° C., more preferably of 120° C. to 170° C., particularly preferably of 125° C. to 150° C. A Tg of 110° C. or higher allows easy production of films with good thermal stability, and a Tg of 185° C. or lower allows easy control of the in-plane retardation and the thickness direction retardation by stretching. The glass transition temperature (Tg) may be determined by DSC method according to JIS K 7121.

Any appropriate forming method may be used to produce a polymer film containing the norbornene resin. Examples of such a forming method include those described in Section C-2. The forming method is preferably a solvent casting method, because polymer films with a high level of smoothness and optical uniformity can be obtained by such a method.

The polymer film containing the norbornene resin may also contain any appropriate additive. Examples of the additive include a plasticizer, a heat stabilizer, a light stabilizer, a lubricant, an antioxidant, an ultraviolet absorbing agent, a flame retardant, a colorant, an antistatic agent, a compatibilizing agent, a crosslinking agent, and a thickener. The content of the additive is preferably more than 0 and not more than 10 parts by weight, based on 100 parts by weight of the norbornene resin.

The polymer film containing the norbornene resin may be obtained from a resin composition containing the norbornene resin and another resin. Any appropriate resin may be selected as the other resin. A styrene resin is preferred as the other resin. The styrene resin may be used to control the wave dispersion or photoelastic coefficient of the retardation film. The content of the other resin is preferably more than 0 and not more than 30 parts by weight, based on 100 parts by weight of the norbornene resin.

A commercially available polymer film containing the norbornene resin may be used as it is. Alternatively, a commercially available film may be subjected to a secondary process such as stretching and/or shrinking and then used. Examples of the commercially available polymer film containing the norbornene resin include ARTON series manufactured by JSR Corporation (such as ARTON F, ARTON FX and ARTON D (trade names)) and ZEONOR series manufactured by Optes Inc. (such as ZEONOR ZF14 and ZEONOR ZF16 (trade names)).

C-2. Optical Properties of Retardation Film

The Re[590] of the retardation film may be any appropriate value, which is chosen depending on the purpose. The Re[590] of the retardation film may be 10 nm or more, preferably from 80 nm to 350 nm, more preferably from 120 nm to 350 nm, still more preferably from 160 nm to 280 nm. Setting Re[590] in the above range allows the production of liquid crystal displays with very low level of color shift and light leakage in oblique directions.

An appropriate value may be chosen as the Re[590] of the retardation film, depending on the Rth[590] of the first protective layer. Preferably, the Re[590] of the retardation film is set such that the sum of the Re[590] of the retardation film and the Rth[590] of the first protective layer (Re[590]+Rth[590]) is from 220 nm to 300 nm. For example, when the first protective layer is substantially optically isotropic and when the |Rth[590]| is less than 10 nm, the Re[590] of the retardation film is preferably from 250 nm to 310 nm. When the Rth[590] of the first protective layer is 40 nm, the Re[590] of the retardation film is preferably from 180 nm to 260 nm. When the Rth[590] of the first protective layer is 60 nm, the Re[590] of the retardation film is preferably from 160 nm to 240 nm. When the Rth[590] of the first protective layer is 100 nm, the Re[590] of the retardation film is preferably from 120 nm to 200 nm.

The wave dispersion (D) of the retardation film is preferably from 0.90 to 1.10, more preferably from 0.95 to 1.05, particularly preferably from 0.98 to 1.02. The wave dispersion (D) is a value calculated from the formula: Re[480]/Re[590], wherein Re[480] and Re[590] are in-plane retardations measured at 23° C. and light wavelengths of 480 nm and 590 nm, respectively. The use of the retardation film with a wave dispersion (D) in the above range allows the production of a liquid crystal display in which the amount of color shift in an oblique direction ($\Delta a^* b^*$) is significantly smaller than that in a liquid crystal display using a conventional retardation film.

The Nz coefficient of the retardation film is preferably from 0.1 to 0.7, more preferably from 0.2 to 0.6, particularly preferably from 0.25 to 0.55, most preferably from 0.35 to 0.55, wherein Re[590] is its in-plane retardation measured at 23° C. and a light wavelength of 590 nm, and Rth[590] is its retardation in its thickness direction that is measured at 23° C. and a light wavelength of 590 nm. Setting the Nz coefficient in the above range allows the production of liquid crystal displays with very low level of color shift and light leakage in oblique directions.

An appropriate value may be chosen as the Nz coefficient of the retardation film, depending on the Rth[590] of the first protective layer. For example, when the first protective layer is substantially optically isotropic and when the |Rth[590]| is less than 10 nm, the Nz coefficient of the retardation film is preferably from 0.4 to 0.6. When the Rth[590] of the first protective layer is 40 nm, the Nz coefficient of the retardation film is preferably from 0.3 to 0.5. When the Rth[590] of the first protective layer is 60 nm, the Nz coefficient of the retardation film is preferably from 0.2 to 0.4. When the Rth[590] of the first protective layer is 100 nm, the Nz coefficient of the retardation film is preferably from 0.1 to 0.3.

An appropriate value may be chosen as the Rth[590] of the retardation film, depending on the Nz coefficient. In a preferred mode, the Rth[590] of the retardation film is smaller than the Re[590] and preferably from 10 nm to 200 nm, more preferably from 20 nm to 180 nm, still more preferably from 30 nm to 140 nm. Setting the Rth[590] in the above range allows the production of liquid crystal displays with very low level of color shift and light leakage in oblique directions.

C-3. Methods for Producing Retardation Films

For example, the retardation film may be produced by a process including the steps of bonding a shrinkable film to both sides of the polymer film containing the norbornene resin and heating and stretching the laminate by a longitudinal uniaxial stretching method with a roll drawing machine. The shrinkable films are used in order to apply a shrinkage force in a direction perpendicular to the stretching direction during heating and stretching and to increase the refractive index (nz) in the thickness direction. Any appropriate method may be used to bond the shrinkable film to both sides of the polymer film. Methods including placing a pressure-sensitive adhesive layer containing an acrylic pressure-sensitive adhesive between the shrinkable film and the polymer film and bonding them are preferred in view of a high level of productivity, workability and cost-effectiveness.

An exemplary method for producing the retardation film will be described with reference to FIG. 3, which is a schematic diagram showing the concept of a typical process for manufacturing the retardation film for use in the invention. For example, while a polymer film 402 is fed from a first feeder 401, shrinkable films 404 and 406 each having a pressure-sensitive adhesive layer are fed from a second feeder 403 and a third feeder 405, respectively and bonded to both sides of the polymer film 402 by means of laminating rolls 407 and 408. While the polymer film with the shrinkable films bonded to its both sides is kept at a constant temperature by heating means 409 and receives a tension in the machine direction from rolls 410, 411, 412, and 413 in different circumferential velocities (and also receives a tension in the thickness direction from the shrinkable films at the same time), it is subjected to a stretching process. The shrinkable films 404 and 406 each with the pressure-sensitive adhesive layer are separated from the stretched film 418 by means of a first winding part 414 and a second winding part 415, respectively, and the stretched film 418 is wound on a third winding part 419.

The shrinkable film is preferably a stretched film such as a biaxially-stretched film and a uniaxially-stretched film. For example, the shrinkable film may be obtained by stretching a sheet-shaped unstretched extruded film in the machine direction and/or the transverse direction at a specific ratio with a simultaneous biaxial stretching machine or the like. The forming and stretching conditions may be appropriately chosen depending on the composition, the type or the purpose of the resin used.

Examples of a material for the shrinkable film include polyester, polystyrene, polyethylene, polypropylene, polyvinyl chloride, and polyvinylidene chloride. The shrinkable film is preferably a polypropylene-containing, biaxially-stretched film. Such a shrinkable film has a high level of shrink uniformity and heat resistance and thus can have a desired retardation value and can form a retardation film with good optical uniformity.

In an embodiment of the invention, the shrinkage rate $S^{140}$[MD] of the shrinkable film at 140° C. in its machine direction is preferably from 5.0% to 7.7%, and the shrinkage rate $S^{140}$[TD] of the shrinkable film at 140° C. in its transverse direction is preferably from 10.0% to 15.5%. More preferably, the shrinkable film has an $S^{140}$[MD] of 5.5% to 7.0% and an $S^{140}$[TD] of 11.5% to 14.5%.

In another embodiment of the invention, the shrinkage rate $S^{160}$[MD] of the shrinkable film at 160° C. in its machine direction is preferably from 15.5% to 23.5%, and the shrinkage rate $S^{160}$[TD] of the shrinkable film at 140° C. in its transverse direction is preferably from 36.5% to 54.5%. More preferably, the shrinkable film has an $S^{160}$[MD] of 17.5% to 21.5% and an $S^{160}$[TD] of 40.0% to 50.0%. Setting the shrinkage rate of the shrinkable film in the above range at each temperature allows the production of retardation films with a desired retardation value and good uniformity.

In an embodiment of the invention, the difference between the shrinkage rate of the shrinkable film at 140° C. in the transverse direction and that in the machine direction ($\Delta S^{140}=S^{140}$[TD]$-S^{140}$[MD]) is preferably from 5.0% to 7.7%, more preferably from 5.7% to 7.0%. In another embodiment of the invention, the difference between the shrinkage rate of the shrinkable film at 160° C. in the transverse direction and that in the machine direction ($\Delta S^{160}=S^{160}$[TD]$-S^{160}$[MD]) is preferably from 20.5% to 31.5%, more preferably from 23.0% to 28.5%. If the shrinkage rate is too large in the MD direction, not only the stretching tension but also the shrinkage force of the shrinkable film can be applied to the stretching machine so that uniform stretching can be difficult. Setting the shrinkage rate of the shrinkable film in the above range allows uniform stretching with no excessive load on the equipment such as the stretching machine.

The shrinkage stress $T^{140}$[TD] of the shrinkable film at 140° C. in the transverse direction is preferably from 0.50 N/2 mm to 0.80 N/2 mm, more preferably from 0.58 N/2 mm to 0.72 N/2 mm. The shrinkage stress $T^{150}$[TD] of the shrinkable film at 150° C. in the transverse direction is preferably from 0.60 N/2 mm to 0.90 N/2 mm, more preferably from 0.67 N/2 mm to 0.83 N/2 mm. Setting the shrinkage rate of the shrinkable film in the above range allows the production of retardation films with a desired retardation value and good optical uniformity.

The shrinkage rates S[MD] and S[TD] may be determined according to the heat shrinkage A method of JIS Z 1712 (1997), except that 140° C. (or 160° C.) is used as the heating temperature in place of 120° C. and that a load of 3 g is applied to the test piece. Specifically, five 20 mm-wide, 150 mm-long test pieces are sampled along each of the machine direction [MD] and the transverse direction [TD] and each finished by putting gauge marks about 100 mm apart at the central portion. The test pieces are vertically hung with a load of 3 g applied thereto in an air circulation type drying oven kept at a temperature of 140° C.±3° C. (or 160° C.±3° C.), heated for 15 minutes and then taken out. The test pieces are then allowed to stand under the standard conditions (room temperature) for 30 minutes. The distance between the gauge marks is then measured with a vernier caliper according to JIS B 7507, and the average of five measurements is calculated. The shrinkage rate may be calculated according to the formula: S(%)=[{(the distance (mm) between the gauge marks before heating)−(the distance (mm) between the gauge marks after heating)}/{(the distance (mm) between the gauge marks before heating)}]×100.

The shrinkable film to be used may be appropriately selected from commercially available shrinkable films for general packaging, food packaging, palette packaging, shrink labels, cap seals, electric insulation, and other applications, as long as they satisfy the characteristics described above such as the shrinkage rate. Such commercially available shrinkable films may be used without modification or after subjected to a secondary process such as a stretching or shrinking process. Examples of such commercially available shrinkable films include ALPHAN series manufactured by Oji paper Co., Ltd. (such as ALPHAN P, ALPHAN S, and ALPHAN H (trade names)), FANCYTOP series manufactured by Gunze Ltd. (such as FANCYTOP EP1 and FANCYTOP EP2 (trade names)), TORAYFAN BO series manufactured by Toray Industries, Inc. (such as TORAYFAN BO 2570, 2873, 2500, 2554, M114, and M304 (trade names)), SunTox-OP series manufactured by SunTox Co., Ltd. (such as PA20, PA21 and PA30 (trade names)), and TOHCELLO OP series manufactured by TOHCELLO Co., Ltd. (such as TOHCELLO OPU-0, OPU-1 and OPU-2 (trade names)).

The temperature in the stretching oven during the heating and stretching of the laminate of the shrinkable films and the polymer film containing the norbornene resin (also referred to as stretching temperature) may be appropriately chosen depending on the desired retardation value and the type and thickness of the polymer film used and so on. The stretching temperature is preferably in the range of Tg+1° C. to Tg+30° C. with respect to the glass transition temperature (Tg) of the polymer film. In this range, the retardation value can be easily made uniform over the retardation film, and the film can resist crystallization (getting clouded). Specifically, the stretching temperature is generally from 110° C. to 185° C. The glass transition temperature (Tg) may be determined by DSC method according to JIS K 7121 (1987).

In the process of stretching the laminate of the shrinkable films and the polymer film containing the norbornene resin, the stretch ratio (draw ratio) may be appropriately chosen depending on the desired retardation value and the type and thickness of the polymer film and so on. The draw ratio is generally more than 1 and not more than 2, based on the original length. In the stretching process, the feed speed is generally from 1 m/minute to 20 m/minute in view of the machine accuracy or stability of the stretching system. Under the stretching conditions described above, the desired retardation value can be achieved, and retardation films with a high level of optical uniformity can be obtained.

D. First Pressure-Sensitive Adhesive Layer

The first pressure-sensitive adhesive layer for use in the invention contains a pressure-sensitive adhesive that may be produced by crosslinking a composition including at least a (meth)acrylate (co)polymer and a crosslinking agent including a peroxide as a main component. As used herein, the term "pressure-sensitive adhesive" refers to a viscoelastic material that shows detectable adhesion at room temperature by pressure contact.

Referring to FIG. 1, a first pressure-sensitive adhesive layer 41 is placed one side of the retardation film 30 which is opposite to the side where the polarizing plate 20 is provided. The first pressure-sensitive adhesive layer is used to fix the laminated film, for example, to a liquid crystal cell of a liquid crystal display. Such a pressure-sensitive adhesive layer may be allowed to strongly adhere to the stretched film (retardation film) containing the norbornene resin. The pressure-sensitive adhesive layer can also provide practically sufficient adhesive properties and adhesion time to the substrate (glass plate) of the liquid crystal cell without causing peeling or bubbles even in a high-temperature, high-humidity environment. At the same time, the pressure-sensitive adhesive layer can be separated from the liquid crystal cell by a small force with no pressure-sensitive adhesive layer or retardation film left on the surface of the liquid crystal cell.

Pressure-sensitive adhesive layers that exhibit strong adhesion to norbornene resin-containing stretched films and moderate adhesion and easy peelability to substrates (glass plates) for liquid crystal cells are not conventionally available. This may because the content of a polar group capable of acting on pressure-sensitive adhesives is lower in norbornene resin-containing stretched films than in other resins such as polycarbonate.

In addition, as described above, norbornene resin-containing stretched films themselves are brittle so that peeling thereof can be more difficult. According to the invention, however, a specific pressure-sensitive adhesive that may be produced by crosslinking a specific composition is used so that liquid crystal display panels with a high level of adhesion and easy peelability can be obtained.

D-1. Physical Properties of First Pressure-Sensitive Adhesive Layer

The first pressure-sensitive adhesive layer may have any appropriate thickness, which is chosen depending on the purpose. The thickness of the first pressure-sensitive adhesive layer is preferably from 2 μm to 50 μm, more preferably from 2 μm to 40 μm, particularly preferably from 5 μm to 35 μm. Setting the thickness of the pressure-sensitive adhesive layer in the above range allows production of the laminated film that has moderate adhesion and a high level of easy peelability.

The transmittance of the first pressure-sensitive adhesive layer is preferably 90% or more when measured at a light wavelength of 590 nm and 23° C. The transmittance has a theoretical upper limit of 100% and a possible upper limit of 96%.

The Re[590] of the first pressure-sensitive adhesive layer is preferably less than 2 nm, more preferably less than 1 nm. The Rth[590] of the pressure-sensitive adhesive layer is preferably less than 2 nm, more preferably less than 1 nm.

The adhesive force ($F_{1A}$) of the first pressure-sensitive adhesive layer to a glass plate at 23° C. is preferably from 2 N/25 mm to 10 N/25 mm, more preferably from 3 N/25 mm to 9 N/25 mm, particularly preferably from 3 N/25 mm to 8 N/25 mm, most preferably from 4 N/25 mm to 6 N/25 mm. The adhesive force may be measured by a process that includes pressing a laminated film with a width of 25 mm against a glass plate by one reciprocation of a 2 kg roller to bond the laminate to the glass plate, aging the laminated film at 23° C. for 1 hour, and then measuring an adhesive strength when the laminated film is peeled in a 90-degree direction at a rate of 300 mm/minute, wherein the adhesive strength is determined as the adhesive force.

The anchoring force ($F_{1B}$) of the pressure-sensitive adhesive layer to the retardation film at 23° C. is preferably from 10 N/25 mm to 40 N/25 mm, more preferably from 14 N/25 mm to 40 N/25 mm, particularly preferably from 17 N/25 mm to 35 N/25 mm. The anchoring force may be measured by a process that includes pressing a laminate of the pressure-sensitive adhesive layer and the retardation film each with a width of 25 mm against the surface of an indium tin oxide (ITO) vapor-deposited onto a polyethylene terephthalate film by one reciprocation of a 2 kg roller to bond the laminate to the polyethylene terephthalate film, aging the laminate at 23° C. for 1 hour, and then measuring an adhesive strength when the polyethylene terephthalate film is peeled together with the pressure-sensitive adhesive layer in a 180-degree direction at a rate of 300 mm/minute, wherein the adhesive strength is determined as the anchoring force.

In the laminated film of the invention, the adhesive force ($F_{1A}$) of the pressure-sensitive adhesive layer to a glass plate at 23° C. and the anchoring force ($F_{1B}$) of the pressure-sensitive adhesive layer to the retardation film at 23° C. preferably have the relation $F_{1A}<F_{1B}$. The difference ($F_{1B}-F_{1A}$) between the anchoring force and adhesive force of the pressure-sensitive adhesive layer is preferably 5 N/25 mm or more, more preferably from 5 N/25 mm to 37 N/25 mm, particularly preferably from 8 N/25 mm to 31 N/25 mm, most preferably from 16 N/25 mm to 30 N/25 mm. If $F_{1A}$ and $F_{1B}$ have the relation as described above, the pressure-sensitive adhesive layer can be separated from a liquid crystal cell with no pressure-sensitive adhesive layer or retardation film left on the surface of the liquid crystal cell, and liquid crystal display panels with a high level of adhesion and easy peelability can be obtained.

The first pressure-sensitive adhesive layer may further contain any appropriate additive. Examples of such an additive include metal powder, glass fibers, glass beads, silica, and fillers. The pressure-sensitive adhesive layer may also contain a material transferred from the adjacent layer (such as a residual solvent, an additive and an oligomer). The content of the additive is preferably more than 0 and not more than 10 parts by weight, based on 100 parts by weight of the total solids of the pressure-sensitive adhesive layer. The content of the transferred material is preferably more than 0 and not more than 5 parts by weight, based on 100 parts by weight of the total solids of the pressure-sensitive adhesive layer.

D-2. Pressure-Sensitive Adhesive for Forming First Pressure-Sensitive Adhesive Layer The pressure-sensitive adhesive for forming the first pressure-sensitive adhesive layer may be produced by crosslinking a composition including at least a (meth)acrylate (co)polymer and a crosslinking agent including a peroxide as a main component. As used herein, the term "crosslinking" refers to forming a three-dimensional network structure by chemical bridging of a polymer.

D-3. Preparation of Raw Material Composition (for First Pressure-Sensitive Adhesive Layer)

Any appropriate (meth)acrylate (co)polymer may be used depending on the purpose. The term "(meth)acrylate (co)polymer" refers to a (co)polymer produced with any (meth)acrylate monomer(s). When the polymer is a copolymer, the polymer may be a random copolymer, a block copolymer or a graft copolymer, while its molecule may have any structural arrangement. The (meth)acrylate (co)polymer is preferably a random copolymer in term of its polymer sequence.

As used herein, the term "(meth)acrylate (co)polymer" means an acrylate polymer or a methacrylate polymer when the polymer is a homopolymer, or it means an acrylate copolymer synthesized from two or more acrylate monomers, a methacrylate copolymer synthesized from two or more methacrylate monomers, or a copolymer synthesized from one or more acrylate monomers and one or more methacrylate monomers when the polymer is a copolymer. The term "(meth)acrylate monomer" means an acrylate monomer or a methacrylate monomer.

The (meth)acrylate (co)polymer may be produced by any appropriate polymerization method. Examples of the polymerization method include a solution polymerization method, a bulk polymerization method and a suspension polymerization method. In the invention, the polymerization method is preferably a solution polymerization method. Specifically, the solution polymerization method may include adding 0.01 to 0.2 parts by weight of a polymerization initiator such as azobisisobutyronitrile to a solution of 100 parts by weight of a monomer or monomers in a solvent and allowing the mixture to react for 8 hours to 30 hours in a nitrogen atmosphere while setting the solution at a temperature of 50° C. to 70° C. Such a polymerization method is advantageous in that the polymerization temperature can be controlled with high precision. It is also advantageous in that the polymer solution can be easily taken out from the reaction vessel after the polymerization.

The weight average molecular weight (Mw) of the (meth)acrylate (co)polymer may be set at any appropriate value. When measured by a gel permeation chromatography (GPC) method using tetrahydrofuran as a solvent, the weight average molecular weight (Mw) is preferably 1,000,000 or more, more preferably from 1,200,000 to 3,000,000, particularly preferably from 1,200,000 to 2,500,000. The weight average molecular weight (Mw) may be appropriately adjusted by controlling the type of the solvent, the polymerization temperature, the additive, and so on.

The (meth)acrylate (co)polymer is preferably a (co)polymer produced with a (meth)acrylate monomer(s) having a straight or branched alkyl group of 1 to 10 carbon atoms. Examples of the (meth)acrylate monomer having a straight or branched alkyl group of 1 to 10 carbon atoms include methyl (meth)acrylate, ethyl (meth)acrylate, propyl (meth)acrylate, n-butyl (meth)acrylate, isobutyl (meth)acrylate, tert-butyl (meth)acrylate, n-pentyl (meth)acrylate, isopentyl (meth)acrylate, n-hexyl (meth)acrylate, isohexyl (meth)acrylate, n-heptyl (meth)acrylate, isoheptyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, and isodecyl (meth)acrylate.

The (meth)acrylate (co)polymer is more preferably a copolymer of a (meth)acrylate monomer having a straight or branched alkyl group of 1 to 8 carbon atoms and another (meth)acrylate monomer having a straight or branched alkyl group of 1 to 8 carbon atoms in which at least one hydrogen atom is replaced with a hydroxyl group. Such a copolymer is highly reactive with the crosslinking agent mainly composed of a peroxide and thus can form a pressure-sensitive adhesive with good adhesive properties.

The number of carbon ($C_1$) atoms in the alkyl group of the (meth)acrylate monomer having the straight or branched alkyl group (in the unit having the alkyl group with no hydroxyl substituent) is preferably from 2 to 8, more preferably from 2 to 6, particularly preferably from 4 to 6. The number of carbon ($C_2$) atoms in the alkyl group of the (meth)acrylate monomer having the straight or branched alkyl group in which at least one hydrogen atom is replaced with a hydroxyl group (in the unit having the alkyl group substituted with a hydroxyl group(s)) is preferably equal to or more than that of the above, more preferably from 2 to 8, particularly preferably from 4 to 6. If the number of carbon atoms in the alkyl group is controlled as described above, the reactivity of the monomer with the crosslinking agent can be increased so that a pressure-sensitive adhesive with better adhesive properties can be obtained.

In particular, the (meth)acrylate (co)polymer is preferably a copolymer of a (meth)acrylate monomer having a straight or branched alkyl group of 1 to 8 carbon atoms and another (meth)acrylate monomer having a straight or branched alkyl group of 1 to 8 carbon atoms in which at least one hydrogen atom is replaced with a hydroxyl group, and the copolymer preferably contains 0.1% by mole to 10.0% by mole of a unit derived from the (meth)acrylate monomer having a straight or branched alkyl group of 1 to 8 carbon atoms in which at least one hydrogen atom is replaced with a hydroxyl group. The content of the unit derived from the (meth)acrylate monomer having a straight or branched alkyl group of 1 to 8 carbon atoms in which at least one hydrogen atom is replaced with a hydroxyl group is more preferably from 0.2% by mole to 5.0% by mole, particularly preferably from 0.3% by mole to 1.1% by mole.

Examples of the (meth)acrylate monomer having a straight or branched alkyl group of 1 to 8 carbon atoms in which at least one hydrogen atom is replaced with a hydroxyl group include 2-hydroxyethyl (meth)acrylate, 3-hydroxypropyl (meth)acrylate, 2-hydroxypropyl (meth)acrylate, 4-hydroxybutyl (meth)acrylate, 3-hydroxybutyl (meth)acrylate, 2-hydroxybutyl (meth)acrylate, 5-hydroxypentyl (meth)acrylate, 3-hydroxy-3-methylbutyl (meth)acrylate, 6-hydroxyhexyl (meth)acrylate, 7-hydroxyheptyl (meth)acrylate, and 8-hydroxyoctyl (meth)acrylate.

Any appropriate crosslinking agent including a peroxide as a main component may be used as the crosslinking agent described above. The peroxide is used to generate radicals by thermal decomposition and to crosslink the (meth)acrylate (co)polymer. Examples of the peroxide include hydroperoxides, dialkyl peroxides, peroxyesters, diacyl peroxides, peroxydicarbonates, peroxyketals, and ketone peroxides. Specific examples of the peroxide include di(2-ethylhexyl) peroxydicarbonate, di(4-tert-butylcyclohexyl) peroxydicarbonate, tert-butyl peroxyneodecanoate, tert-hexyl peroxypivalate, tert-butyl peroxypivalate, dilauroyl peroxide, di-n-octanoyl peroxide, 1,1,3,3-tetramethylbutylperoxy-2-ethyl hexanoate, di(4-methylbenzoyl)peroxide, dibenzoyl peroxide, tert-butylperoxybutyrate, benzoyl-m-methylbenzoyl peroxide, and m-toluoyl peroxide. One or more of these peroxides may be used singly or in any combination.

The crosslinking agent preferably includes a diacyl peroxide, more preferably dibenzoyl peroxide and/or benzoyl-m-methylbenzoyl peroxide. Such peroxides typically have a half-life of one minute at a temperature of 90° C. to 140° C. and thus have good storage stability and allow high-precision control of the crosslinking reaction.

A commercially available product may be used as the crosslinking agent without modification, or a mixture of a commercially available product and a solvent and/or an additive may be used as the crosslinking agent. Examples of commercially available crosslinking agents each including a peroxide as a main component include PEROYL series manufactured by NOF CORPORATION (such as PEROYL IB, 335, L, SA, IPP, NPP, and TCP (trade names)) and NYPER series manufactured by NOF CORPORATION (such as NYPER FF, BO, NS, E, BMT-Y, BMT-K40, and BMT-M (trade names)).

The crosslinking agent may have any appropriate content, which is chosen depending on the purpose. The content of the crosslinking agent is preferably from 0.01 to 1.0 part by weight, more preferably from 0.05 to 0.8 parts by weight, particularly preferably from 0.1 to 0.5 parts by weight, most preferably from 0.15 to 0.45 parts by weight, based on 100 parts by weight of the (meth)acrylate (co)polymer. Setting the content of the crosslinking agent in the above range allows the production of pressure-sensitive adhesive layers having good adhesive properties and low moisture content, and as a result, liquid crystal display panels with a high level of adhesion and easy peelability can be obtained.

In an embodiment of the invention, the composition may further include an isocyanate group-containing compound and/or a silane coupling agent. The isocyanate group-containing compound may be used to increase the adhesive strength (also referred to as anchoring force) at the interface between the first pressure-sensitive adhesive layer and the retardation film. The silane coupling agent may be used to increase the adhesion to the substrate of the liquid crystal cell.

Any appropriate isocyanate group-containing compound may be chosen as the isocyanate group-containing compound described above. Examples of the isocyanate group-containing compound include tolylene diisocyanate, chlorophenylene diisocyanate, hexamethylene isocyanate, tetramethylene isocyanate, isophorone diisocyanate, xylylene diisocyanate, diphenylmethane isocyanate, and trimethylolpropane xylene diisocyanate. Examples thereof also include adduct type isocyanate compounds, isocyanurate compounds and biuret type compounds each prepared with any of the above isocyanate group-containing compounds. One or more of these isocyanate group-containing compounds may be used singly or in any combination. Trimethylolpropane xylene diisocyanate is preferably used as the isocyanate group-containing compound for the first pressure-sensitive adhesive layer.

A commercially available product may be used as the isocyanate group-containing compound without modification. Alternatively, a commercially available isocyanate group-containing compound may be mixed with a solvent or an additive before use. Examples of the commercially available isocyanate group-containing compound include TAKENATE series manufactured by Mitsui Takeda Chemicals, Inc. (such as TAKENATE 500, 600 and 700 (trade names)) and Coronate series manufactured by Nippon Polyurethane Industry Co., Ltd. (such as Coronate L, MR, EH, and HL (trade names)).

The isocyanate group-containing compound may have any appropriate content, which is chosen depending on the purpose. The content of the isocyanate group-containing compound is preferably from 0.005 to 1.0 part by weight, more preferably from 0.008 to 0.8 parts by weight, particularly preferably from 0.01 to 0.5 parts by weight, most preferably from 0.015 to 0.2 parts by weight, based on 100 parts by weight of the (meth)acrylate (co)polymer. Setting the content of the isocyanate group-containing compound in the above range allows the production of liquid crystal display panels that resist peeling at the interface between the pressure-sensitive adhesive layer and the retardation film even in a more severe high-temperature, high-humidity environment.

A silane coupling agent having any appropriate functional group may be chosen as the silane coupling agent described above. Examples of such a functional group include vinyl, epoxy, methacryloxy, amino, mercapto, acryloxy, acetoacetyl, isocyanate, styryl, and polysulfide groups. Examples of the silane coupling agent include vinyltrimethoxysilane, γ-glycidoxypropyltrimethoxysilane, γ-glycidoxypropyltriethoxysilane, p-styryltrimethoxysilane, γ-methacryloxypropyltrimethoxysilane, γ-acryloxypropyltrimethoxysilane, N-β(aminoethyl)γ-aminopropyltrimethoxysilane, γ-aminopropylmethoxysilane, γ-mercaptopropylmethyldimethoxysilane, bis(triethoxysilylpropyl)tetrasulfide, and γ-isocyanatepropyltrimethoxysilane. The silane coupling agent for use in the first pressure-sensitive adhesive layer is preferably an acetoacetyl group-containing silane coupling agent.

A commercially available product may be used as the silane coupling agent without modification. Alternatively, a solvent or an additive may be added to a commercially available silane coupling agent before use. Examples of the commercially available silane coupling agent include KA series manufactured by Shin-Etsu Chemical Co., Ltd. (such as KA-1003 (trade name)), KBM series manufactured by Shin-Etsu Chemical Co., Ltd. (such as KBM-303, KBM-403 and KBM-503 (trade names)), KBE series manufactured by Shin-Etsu Chemical Co., Ltd. (such as KBE-402, KBE-502 and KBE-903 (trade names)), SH series manufactured by TORAY INDUSTRIES, INC. (such as SH6020, SH6040 and SH6062 (trade names)), and SZ series manufactured by TORAY INDUSTRIES, INC. (such as SZ6030, SZ6032 and SZ6300 (trade names)).

The silane coupling agent may have any appropriate content, which is chosen depending on the purpose. The content of the silane coupling agent is preferably from 0.001 to 2.0 parts by weight, more preferably from 0.005 to 2.0 parts by weight, particularly preferably from 0.01 to 1.0 part by weight, most preferably from 0.02 to 0.5 parts by weight, based on 100 parts by weight of the (meth)acrylate (co)polymer. Setting the content of the silane coupling agent in the above range allows the production of liquid crystal display panels that are free from peeling or bubbles even in a more severe high-temperature, high-humidity environment.

In an embodiment of the invention, the composition is prepared by a method including Steps 1-A and 1-B described below.

Step 1-A: the step of diluting the (meth)acrylate (co)polymer with a solvent to prepare a polymer solution (1-A); and Step 1-B: the step of adding the crosslinking agent mainly composed of the peroxide, the isocyanate group-containing compound, and the silane coupling agent to the polymer solution (1-A) obtained in Step 1-A to prepare a polymer solution (1-B).

Steps 1-A and 1-B are each performed in order that a homogeneous composition may be obtained by dispersing or dissolving the added material or materials. When the (meth)acrylate (co)polymer is produced by a solution polymerization method, the resulting reaction solution may be used as the polymer solution (1-A) without modification. Alternatively, the resulting reaction solution may be diluted by adding a solvent thereto and then used.

Any solvent with which the (meth)acrylate (co)polymer can be uniformly diluted to form a solution is preferably used as the solvent described above. Examples of the solvent include toluene, xylene, chloroform, dichloromethane, dichloroethane, phenol, diethyl ether, tetrahydrofuran, anisole, tetrahydrofuran, acetone, methyl isobutyl ketone, methyl ethyl ketone, cyclohexanone, cyclopentanone, 2-hexanone, 2-pyrrolidone, N-methyl-2-pyrrolidone, n-butanol, 2-butanol, cyclohexanol, isopropyl alcohol, tert-butyl alcohol, glycerol, ethylene glycol, diethylene glycol dimethyl ether, 2-methyl-2,4-pentanediol, dimethylformamide, dimethylacetamide, acetonitrile, butyronitrile, methyl cellosolve, methyl cellosolve acetate, ethyl acetate, and butyl acetate. The solvent is preferably toluene or ethyl acetate. These solvents are highly producible, workable and economical.

The polymer solution (1-B) preferably has a total solids content of 1% by weight to 40% by weight, more preferably of 5% by weight to 30% by weight. Setting the total solids content in the above range allows the production of a solution with good coatability to substrates so that a pressure-sensitive adhesive layer with good surface uniformity can be obtained.

Besides the above components, the composition may also contain any appropriate additive. Examples of the additive include a plasticizer, a heat stabilizer, a light stabilizer, a lubricant, an antioxidant, an ultraviolet absorbing agent, a flame retardant, a colorant, an antistatic agent, a compatibilizing agent, a crosslinking agent, and a thickener. The additive may have any appropriate content (in weight ratio), which is set depending on the purpose. Preferably, the content of the additive is more than 0 and not more than 5 parts by weight, based on 100 parts by weight of the (meth)acrylate (co)polymer. Any appropriate method may be used to add each material in the process of preparing the composition. In a preferred mode, the composition may be prepared by adding the crosslinking agent mainly composed of the peroxide, the isocyanate group-containing compound and the silane coupling agent in this order to the (meth)acrylate (co)polymer. If one or both of the isocyanate group-containing compound and the silane coupling agent are not added, the step of addition thereof will be omitted.

D-4. Method for Crosslinking the Composition (for First Pressure-Sensitive Adhesive Layer)

Any appropriate method may be used to crosslink the composition, depending on the purpose. A method including heating the composition at a temperature of 50° C. to 200° C. is preferably used. The heating temperature is preferably from 70° C. to 190° C., more preferably from 100° C. to 180° C., particularly preferably from 120° C. to 170° C. If the heating temperature is set in the above range, the crosslinking reaction between the peroxide and the polymer can rapidly occur with no side reaction so that a pressure-sensitive adhesive with good adhesive properties can be obtained.

When the heating method is used to crosslink the composition, any appropriate heating time may be used. The heating time is preferably from 5 seconds to 20 minutes, more preferably from 5 seconds to 10 minutes, particularly preferably from 10 seconds to 5 minutes. Setting the heating time in the above range allows an efficient crosslinking reaction between the peroxide and the polymer.

In an embodiment of the invention, the composition is crosslinked by a method including Steps 1-A and 1-B described above and then Steps 1-C and 1-D described below.

Step 1-C: the step of applying the polymer solution (1-B) obtained in Step 1-B; and Step 1-D: the step of drying the coating obtained in Step 1-C at a temperature of 50° C. to 200° C. to form a pressure-sensitive adhesive layer on the surface of a substrate.

Step 1-C may be performed in order that a thin film-shaped coating may be obtained by thinly spreading the polymer solution on a substrate. Step 1-D may be performed in order to evaporate the solvent from the coating and to crosslink the peroxide and the polymer. The drying may be performed in a multistage manner using a plurality of temperature control means set at different temperatures, respectively. By such a method, a pressure-sensitive adhesive layer can be efficiently obtained with less variation in thickness, and the crosslinking reaction between the peroxide and the polymer can be properly performed so that a pressure-sensitive adhesive layer with good adhesive properties can be obtained.

A coating method using any appropriate coater may be used to apply the polymer solution (1-B) to a substrate. Examples of the coater include a reverse roll coater, a forward roll coater, a gravure coater, a knife coater, a rod coater, a slot orifice coater, a curtain coater, a fountain coater, an air doctor coater, a kiss coater, a dip coater, a bead coater, a blade coater, a cast coater, a spray coater, a spin coater, an extrusion coater, and a hot melt coater. Preferred coaters include a reverse roll coater, a gravure coater, a slot orifice coater, a curtain coater, and a fountain coater. A coating with good surface uniformity can be obtained by a coating method using any of the above coaters.

Any appropriate substrate may be chosen as the substrate described above, depending on the purpose. The substrate to be used preferably has a release-treated surface on the side where the polymer solution (1-B) will be applied. A polymer film is preferably used as the substrate, because it allows roll production and can significantly increase the productivity. The substrate may be the retardation film used in the invention or any other polymer film. The substrate is preferably a polyethylene terephthalate film treated with a silicone release agent. In this mode, the substrate may be used as a release liner for the film, and the release liner is peeled off before the laminated film is practically used.

Any appropriate temperature control means may be used to heat and dry the composition. Examples of the temperature control means include an air circulation type thermostatic oven with circulated hot air or cold air, a heater using a microwave, a far infrared ray or the like, and a roll, heat pipe roll or metal belt heated for temperature control.

In an embodiment of the invention, the pressure-sensitive adhesive layer is laminated by a method further including Step 1-E described below after Steps 1-A to 1-D.

Step 1-E: the step of transferring, to the retardation film, the pressure-sensitive adhesive layer formed on the surface of the substrate by Step 1-D to form a laminate.

Such a method allows the production of a laminated film which resists changes in the optical properties of the retardation film and has a high level of optical properties. The pressure-sensitive adhesive layer may be separated from the substrate and then transferred to the retardation film, may be transferred to the retardation film while separated from the substrate, or may be transferred to the retardation film and then separated from the substrate. After this process, a highly uniform laminate of the pressure-sensitive adhesive layer and the retardation film can be obtained.

When the first pressure-sensitive adhesive layer used in the invention contains a pressure-sensitive adhesive that may be produced by crosslinking the composition containing the isocyanate group-containing compound, the pressure-sensitive adhesive layer is preferably aged by a method further including Step 1-F after Step 1-E.

Step 1-F: the step of storing the laminate obtained in Step 1-E for at least three days.

Step 1-F is performed in order to age the pressure-sensitive adhesive layer. As used herein, the term "age (or aging)" means that the pressure-sensitive adhesive layer is allowed to stand (stored) under appropriate conditions for a certain period of time so that the diffusion or chemical reaction of the substances in the pressure-sensitive adhesive layer is allowed to proceed to produce preferred properties or states.

Any appropriate temperature may be chosen as the temperature for aging the pressure-sensitive adhesive layer (aging temperature), depending on the type of the polymer or the crosslinking agent, the aging time period and so on. The aging temperature is preferably from 10° C. to 80° C., more preferably from 20° C. to 60° C., particularly preferably from 20° C. to 40° C. If the above temperature range is selected, a pressure-sensitive adhesive layer with stable adhesive properties can be obtained.

Any appropriate time may be chosen as the time for aging the pressure-sensitive adhesive layer (aging time), depending on the type of the polymer or the crosslinking agent, the aging temperature and so on. The aging time is preferably 3 days or more, more preferably 5 days or more, particularly preferably 7 days or more. If the above time is selected, a pressure-sensitive adhesive layer with stable adhesive properties can be obtained.

An example of the method for producing the first pressure-sensitive adhesive layer is described with reference to FIG. 6. FIG. 6 is a schematic diagram illustrating the concept of a typical process for forming the first pressure-sensitive adhesive layer for use in the invention. For example, a silicone release agent-treated polyethylene terephthalate film 502 is fed as a substrate from a first feeder 501 and coated at a coater unit 503 with the polymer solution (1-B) which is prepared by adding the crosslinking agent mainly composed of a peroxide, the isocyanate group-containing compound and the silane coupling agent to the polymer solution (1-A) prepared by diluting the (meth)acrylate (co)polymer with a solvent. The coating formed on the surface of the substrate is fed to a temperature controller (drying means) 504 and dried and crosslinked, for example, at a temperature of 50° C. to 200° C., resulting in a pressure-sensitive adhesive layer. A retardation film 506 is fed from a second feeder 506 and transferred to the pressure-sensitive adhesive layer on laminating rolls 507 and 508. The resulting laminate 509 of the retardation film, the pressure-sensitive adhesive layer and the silicone release agent-treated polyethylene terephthalate film 502 is wound on a winding part 510. The silicone release agent-treated polyethylene terephthalate film 502 is used by itself as a release liner.

D-5. Physical and Chemical Properties of the First Pressure-Sensitive Adhesive Layer The pressure-sensitive adhesive that may be obtained by the method described above (accordingly, the first pressure-sensitive adhesive layer) is preferably characterized by the physical and chemical properties described below.

The pressure-sensitive adhesive preferably has a gel fraction of 40% to 90%, more preferably of 50% to 90%, particularly preferably of 60% to 85%. If the gel fraction is set in the above range, a pressure-sensitive adhesive layer with good adhesive properties can be obtained. When immersed in a solvent, a part where the polymer of the pressure-sensitive adhesive is crosslinked and has a three-dimensional network structure (also referred to as a gel part) generally absorbs the solvent to increase its volume. This phenomenon is called swelling. The gel fraction may be a value measured by the method described in the section "EXAMPLES."

The pressure-sensitive adhesive preferably has a glass transition temperature (Tg) of −70° C. to −10° C., more preferably of −60° C. to −20° C., particularly preferably of −50° C. to −30° C. Setting the glass transition temperature in the above range allows the production of a pressure-sensitive adhesive layer that has strong adhesion to the retardation film and has moderate adhesion and a high level of easy peelability to the substrate (a glass plate) of a liquid crystal cell.

The pressure-sensitive adhesive preferably has a moisture content of 1.0% or less, more preferably of 0.8% or less, particularly preferably of 0.6% or less, most preferably of 0.4%. The theoretical lower limit of the moisture content is zero. Setting the moisture content in the above range allows the production of a pressure-sensitive adhesive layer that resists foaming even in a high-temperature environment. The moisture content may be a value determined by a process that includes placing the pressure-sensitive adhesive layer in an air circulation type thermostatic oven at 150° C. and determining the weight loss ratio after a lapse of one hour.

E. second Pressure-Sensitive Adhesive Layer

In a preferred embodiment of the invention, the laminated film further includes a second pressure-sensitive adhesive layer between the polarizing plate and the retardation film. FIG. 5 is a schematic cross-sectional view of a laminated film according to an embodiment of the invention. It should be noted that the length, width and thickness of each component in FIG. 1 are not shown in a true ratio for convenience of easy reference. This laminated film 11 includes at least a polarizing plate 20, a second pressure-sensitive adhesive layer 42, retardation film 30, and a first pressure-sensitive adhesive layer 41, provided in this order. The polarizing plate 20 includes a polarizer 21, a first protective layer 21 placed on a side of the polarizer 21 where the retardation film 30 is provided, and a second protective layer 23 placed on another side of the polarizer 21 which is opposite to the side where the retardation film 30 is provided. The retardation film 30 is a stretched film which includes a norbornene resin. The first pressure-sensitive adhesive layer 41 includes a pressure-sensitive adhesive that may be produced by crosslinking a composition which includes a (meth)acrylate (co)polymer and a crosslinking agent comprising a peroxide as a main component. The second pressure-sensitive adhesive layer includes a pressure-sensitive adhesive that may be produced by crosslinking a composition comprising a (meth)acrylate (co) polymer, a silane coupling agent, and a crosslinking agent comprising an isocyanate group-containing compound as a main component.

E-1. Physical Properties of Second Pressure-Sensitive Adhesive Layer

The second pressure-sensitive adhesive layer may have any appropriate thickness, which is chosen depending on the purpose. The thickness of the pressure-sensitive adhesive layer is preferably from 2 μm to 50 μm, more preferably from 2 μm to 40 μm, particularly preferably from 5 μm to 35 μm. Setting the thickness of the pressure-sensitive adhesive layer in the above range allows the production of pressure-sensitive adhesive layer with a with good adhesive properties.

The transmittance of the second pressure-sensitive adhesive layer is preferably 90% or more when measured at a light wavelength of 590 nm and 23° C. The transmittance has a theoretical upper limit of 100% and a possible upper limit of 96%.

The Re[590] of the second pressure-sensitive adhesive layer is preferably less than 2 nm, more preferably less than 1 nm. The Rth[590] of the pressure-sensitive adhesive layer is preferably less than 2 nm, more preferably less than 1 nm.

The adhesive force ($F_{2A}$) of the pressure-sensitive adhesive layer to a glass plate at 23° C. is preferably from 8 N/25 mm to 40 N/25 mm, more preferably from 6 N/25 mm to 40 N/25 mm, particularly preferably from 10 N/25 mm to 35 N/25 mm.

The adhesive force may be measured by a process that includes pressing a 25 mm width of polarizing plate with pressure-sensitive adhesive layer against a glass plate by one reciprocation of a 2 kg roller to bond the laminate to the glass plate, aging the laminate at 23° C. for 1 hour, and then measuring an adhesive strength when the polarizing plate with pressure-sensitive adhesive layer is peeled in a 90-degree direction at a rate of 300 mm/minute, wherein the adhesive strength is determined as the adhesive force.

The anchoring force ($F_{2B}$) of the second pressure-sensitive adhesive layer to the polarizing plate (to the first protective layer) at 23° C. is preferably from 10 N/25 mm to 40 N/25 mm, more preferably from 13 N/25 mm to 40 N/25 mm, particularly preferably from 16 N/25 mm to 35 N/25 mm. The anchoring force may be measured by a process that includes pressing a laminate of a pressure-sensitive adhesive layer and a polarizing plate each with a width of 25 mm against the surface of an indium tin oxide vapor-deposited onto a polyethylene terephthalate film by one reciprocation of a 2 kg roller to bond the laminate to the polyethylene terephthalate film, aging the laminate at 23° C. for 1 hour, and then measuring an adhesive strength when the polyethylene terephthalate film is peeled together with the pressure-sensitive adhesive layer in a 180-degree direction at a rate of 300 mm/minute, wherein the adhesive strength is determined as the anchoring force.

In the laminated film of the invention, the adhesive force ($F_{1A}$) of the first pressure-sensitive adhesive layer to a glass plate at 23° C., the anchoring force ($F_{1B}$) of the first pressure-sensitive adhesive layer to the retardation film at 23° C., the adhesive force ($F_{2A}$) of the second pressure-sensitive adhesive layer to a retardation film at 23° C., and the adhesive force ($F_{2B}$) of the second pressure-sensitive adhesive layer to a polarizing plate (to a first protective layer) retardation film at 23° C. are set to have a relation that $F_{1A}$ is minimum, have a relation, for example, $F_{1A} < F_{2A} \leq F_{2B}$.

In a preferred embodiment of the invention, the difference ($F_{2A}-F_{1A}$) between the anchoring force ($F_{2A}$) of the second pressure-sensitive adhesive layer at 23° C. to the retardation film and the adhesive force ($F_{1A}$) of the first pressure-sensitive adhesive layer at 23° C. to a glass plate is preferably 3N/25 mm or more, more preferably from 3 N/25 mm to 37 N/25 mm, particularly preferably from 4 N/25 mm to 37 N/25 mm, most preferably from 5 N/25 mm to 31 N/25 mm. If $F_{2A}$ and $F_{1A}$ have the relation as described above, the pressure-sensitive adhesive layer with easy peelability can be obtained, thus can be separated from a liquid crystal cell with no pressure-sensitive adhesive layer or retardation film left on the surface of the liquid crystal cell.

In another preferred embodiment of the invention, the difference ($F_{2B}-F_{1A}$) between the anchoring force ($F_{2B}$) of the second pressure-sensitive adhesive layer at 23° C. to the polarizing plate (to the first protective layer) and the adhesive force ($F_{1A}$) of the first pressure-sensitive adhesive layer at 23° C. to a glass plate is preferably 5N/25 mm or more, more preferably from 5 N/25 mm to 40 N/25 mm, particularly preferably from 6 N/25 mm to 37 N/25 mm, most preferably from 6 N/25 mm to 31 N/25 mm. If $F_{2B}$ and $F_{1A}$ have the relation as described above, the pressure-sensitive adhesive layer with easy peelability can be obtained, thus can be separated from a liquid crystal cell with no pressure-sensitive adhesive layer or retardation film left on the surface of the liquid crystal cell.

The second pressure-sensitive adhesive layer may further contain any appropriate additive. Examples of such an additive include metal powder, glass fibers, glass beads, silica, and fillers. The pressure-sensitive adhesive layer may also contain a material transferred from the adjacent layer (such as a residual solvent, an additive and an oligomer). The content of the additive is preferably more than 0 and not more than 10 parts by weight, based on 100 parts by weight of the total solids of the pressure-sensitive adhesive layer. The content of the transferred material is preferably more than 0 and not more than 5 parts by weight, based on 100 parts by weight of the total solids of the pressure-sensitive adhesive layer.

The pressure-sensitive adhesive for forming the second pressure-sensitive adhesive layer may be produced by crosslinking a composition comprising a (meth)acrylate (co)polymer, a silane coupling agent, and a crosslinking agent comprising an isocyanate group-containing compound as a main component.

Any appropriate (meth)acrylate (co)polymer may be used depending on the purpose. The term "(meth)acrylate (co)polymer" refers to a (co)polymer produced with any (meth) acrylate monomer(s). When the polymer is a copolymer, the polymer may be a random copolymer, a block copolymer or a graft copolymer, while its molecule may have any structural arrangement. The (meth)acrylate (co)polymer is preferably a random copolymer in term of its polymer sequence. The (meth)acrylate (co)polymer may be produced by the method described in the section D-3.

The weight average molecular weight (Mw) of the (meth) acrylate (co)polymer may be set at any appropriate value. When measured by a gel permeation chromatography (GPC) method using tetrahydrofuran as a solvent, the weight average molecular weight (Mw) is preferably 1,000,000 or more, more preferably from 1,200,000 to 3,000,000, particularly preferably from 1,200,000 to 2,500,000. The weight average molecular weight (Mw) may be appropriately adjusted by controlling the type of the solvent, the polymerization temperature, the additive, and so on.

Examples of the (meth)acrylate (co)polymer that may be used are the same as described in the section D-3. The (meth) acrylate (co)polymer is preferably a copolymer of a (meth) acrylate monomer having a straight or branched alkyl group of 1 to 8 carbon atoms and another (meth)acrylate monomer having a straight or branched alkyl group of 1 to 8 carbon atoms in which at least one hydrogen atom is replaced with a hydroxyl group. Such a copolymer is highly reactive with the crosslinking agent mainly composed of a peroxide and thus can form a pressure-sensitive adhesive with good adhesive properties.

The number of carbon ($C_1$) atoms in the alkyl group of the (meth)acrylate monomer having the straight or branched alkyl group (in the unit with no hydroxyl substituent) is preferably from 2 to 8, more preferably from 2 to 6, particularly preferably from 4 to 6. The number of carbon ($C_2$) atoms in the alkyl group of the (meth)acrylate monomer having the straight or branched alkyl group in which at least one hydrogen atom is replaced with a hydroxyl group (in the unit substituted with a hydroxyl group(s)) is preferably less than that of the $C_1$ above, more preferably from 2 to 4, particularly preferably 2. If the number of carbon atoms in the alkyl group is controlled as described above, the reactivity of the monomer with the crosslinking agent can be increased so that a pressure-sensitive adhesive with better adhesive properties can be obtained.

In particular, the (meth)acrylate (co)polymer is preferably a copolymer of a (meth)acrylate monomer having a straight or branched alkyl group of 1 to 8 carbon atoms and another (meth)acrylate monomer having a straight or branched alkyl group of 1 to 8 carbon atoms in which at least one hydrogen atom is replaced with a hydroxyl group, and the copolymer preferably contains 0.05% by mole to 0.25% by mole of a unit derived from the (meth)acrylate monomer having a straight or branched alkyl group of 1 to 8 carbon atoms in which at least one hydrogen atom is replaced with a hydroxyl group. The content of the unit derived from the (meth)acrylate monomer having a straight or branched alkyl group of 1 to 8 carbon atoms in which at least one hydrogen atom is replaced with a hydroxyl group is more preferably from 0.10% by mole to 0.22% by mole, particularly preferably from 0.14% by mole to 1.20% by mole.

Examples of the (meth)acrylate monomer having a straight or branched alkyl group of 1 to 8 carbon atoms in which at least one hydrogen atom is replaced with a hydroxyl group include 2-hydroxyethyl (meth)acrylate, 3-hydroxypropyl (meth)acrylate, 2-hydroxypropyl (meth)acrylate, 4-hydroxybutyl (meth)acrylate, 3-hydroxybutyl (meth)acrylate, 2-hydroxybutyl (meth)acrylate, 5-hydroxypentyl (meth)acrylate, 3-hydroxy-3-methylbutyl (meth)acrylate, 6-hydroxyhexyl (meth)acrylate, 7-hydroxyheptyl (meth)acrylate, and 8-hydroxyoctyl (meth)acrylate.

Any appropriate crosslinking agent including comprising an isocyanate group-containing compound as a main component may be used as the crosslinking agent described above. The isocyanate group-containing compound may be used is the same as described in the section D-3.

Any appropriate content may be chosen as the content of the crosslinking agent. The content of the crosslinking agent is preferably from 0.15 to 1.0 part by weight, more preferably from 0.30 to 0.90 parts by weight, particularly preferably from 0.39 to 0.81 parts by weight, most preferably from 0.48 to 0.72 parts by weight, based on 100 parts by weight of the (meth)acrylate (co)polymer. Setting the content of the crosslinking agent in the above range allows strong adhesion to the retardation film even in a high-temperature, high-humidity environment.

Examples of the silane coupling agent may be used are the same as described in the section D-3. The silane coupling agent for use in the first pressure-sensitive adhesive layer is preferably an epoxy group-containing silane coupling agent, more preferably glycidoxypropyltrimethoxysilane.

The silane coupling agent may have any appropriate content, which is chosen depending on the purpose. The content of the silane coupling agent is preferably from 0.01 to 0.20 parts by weight, more preferably from 0.037 to 0.113 parts by weight, particularly preferably from 0.049 to 0.101 part by weight, most preferably from 0.060 to 0.090 parts by weight, based on 100 parts by weight of the (meth)acrylate (co)polymer. Setting the content of the silane coupling agent in the above range allows the production of liquid crystal display panels that are free from peeling or bubbles even in a more severe high-temperature, high-humidity environment.

In an embodiment of the invention, the composition is prepared by a method including Steps 2-A and 2-B described below.

Step 2-A: the step of diluting the (meth)acrylate (co)polymer with a solvent to prepare a polymer solution (2-A); and Step 2-B: the step of adding the isocyanate group-containing compound, and the silane coupling agent to the polymer solution (2-A) obtained in Step 2-A to prepare a polymer solution (2-B).

Steps 2-A and 2-B are each performed in order that a homogeneous composition may be obtained by dispersing or dissolving the added material or materials. When the (meth)acrylate (co)polymer is produced by a solution polymerization method, the resulting reaction solution may be used as the polymer solution (2-A) without modification. Alternatively, the resulting reaction solution may be diluted by adding a solvent thereto and then used.

Examples of the solvent may be used are the same as described in the section D-3. The solvent is preferably toluene or ethyl acetate, and butyl acetate. The solvent is preferably toluene or ethyl acetate. These solvents are highly producible, workable and economical. These solvents are highly producible, workable and economical.

The polymer solution (2-B) preferably has a total solids content of 5% by weight to 50% by weight, more preferably of 10% by weight to 40% by weight. Setting the total solids content in the above range allows the production of a solution with good coatability to substrates so that a pressure-sensitive adhesive layer with good surface uniformity can be obtained.

Besides the above components, the composition may also contain any appropriate additive. Examples of the additive used are the same as described in the section D-3. Preferably, the content of the additive is more than 0 and not more than 5 parts by weight, based on 100 parts by weight of the (meth)acrylate (co)polymer. (meth)acrylate (co)polymer.

Any appropriate method may be used to add each material in the process of preparing the composition. In a preferred mode, the composition may be prepared by adding the crosslinking agent mainly composed of the isocyanate group-containing compound and the silane coupling agent in this order to the (meth)acrylate (co)polymer.

E-4. Method for Crosslinking the Composition (for First Pressure-Sensitive Adhesive Layer)

Any appropriate method may be used to crosslink the composition, depending on the purpose. A method including heating the composition at a temperature of 20° C. to 200° C. is preferably used. The heating temperature is preferably from 50° C. to 170° C. Setting the heating temperature in the above range allows a production of an adhesive layer with good surface uniformity.

When the heating method is used to crosslink the composition, any appropriate heating time may be used. The heating time is preferably from 10 seconds to 20 minutes, more preferably from 20 seconds to 10 minutes, particularly preferably from 30 seconds to 5 minutes. Setting the heating time in the above range allows a production of an adhesive layer with good surface uniformity.

In an embodiment of the invention, the composition is crosslinked by a method including Steps 2-A and 2-B described above and then Steps 2-C and 2-D described below.

Step 2-C: the step of applying the polymer solution (2-B) obtained in Step 1-B; and Step 2-D: the step of drying the coating obtained in Step 2-C at a temperature of 20° C. to 200° C. to form a pressure-sensitive adhesive layer on the surface of a substrate.

Step 2-C may be performed in order that a coating layer with less variation in thickness can be obtained. Step 2-D may be performed in order to evaporate the solvent from the coating layer. The drying may be performed in a multistage manner using a plurality of temperature control means set at different temperatures, respectively. By such a method, a pressure-sensitive adhesive layer can be efficiently obtained with less variation in thickness.

Coating methods using appropriate coaters, substrates, and temperature control means, described in the section D-4 may be used as a coating method, a substrate, and a temperature control mean for the polymer solution (2-B), respectively.

In an embodiment of the invention, the pressure-sensitive adhesive layer is laminated and aged by a method further including Step 2-E and 2-F described below after Steps 2-A to 2-D.

Step 2-E: the step of transferring, to the retardation film, the pressure-sensitive adhesive layer formed on the surface of the substrate by Step 2-D to form a laminate.

Step 2-F: the step of storing the laminate obtained in Step 1-E for at least three days.

Such a method allows the production of a laminated film which resists changes in the optical properties of the retardation film and has a high level of optical properties. The pressure-sensitive adhesive layer may be separated from the substrate and then transferred to the retardation film, may be transferred to the retardation film while separated from the substrate, or may be transferred to the retardation film and then separated from the substrate. After this process, a highly uniform laminate of the pressure-sensitive adhesive layer and the retardation film can be obtained. Step 1-F is performed in order to age the pressure-sensitive adhesive layer.

Any appropriate temperature may be chosen as the temperature for aging the pressure-sensitive adhesive layer (aging temperature), depending on the type of the polymer or the crosslinking agent, the aging time period and so on. The aging temperature is preferably from 10° C. to 80° C., more preferably from 20° C. to 60° C., particularly preferably from 20° C. to 40° C. If the above temperature range is selected, a pressure-sensitive adhesive layer with stable adhesive properties can be obtained.

Any appropriate time may be chosen as the time for aging the pressure-sensitive adhesive layer (aging time), depending on the type of the polymer or the crosslinking agent, the aging temperature and so on. The aging time is preferably 3 days or more, more preferably 5 days or more, particularly preferably 7 days or more. If the above time is selected, a pressure-sensitive adhesive layer with stable adhesive properties can be obtained.

E-5. Physical and Chemical Properties of the Second Pressure-Sensitive Adhesive Layer The pressure-sensitive adhesive that may be obtained by the method described above (accordingly, the second pressure-sensitive adhesive layer) is preferably characterized by the physical and chemical properties described below.

The pressure-sensitive adhesive preferably has a gel fraction of 60% to 96%, more preferably of 70% to 94%, particularly preferably of 78% to 92%. If the gel fraction is set in the above range, an pressure-sensitive adhesive layer that has strong adhesion to the retardation film and has good adhesive properties to the substrate (a glass plate) of a liquid crystal cell.

The pressure-sensitive adhesive preferably has a glass transition temperature (Tg) of −42° C. to −14° C., more preferably of −37° C. to −18° C., particularly preferably of −34° C. to −21° C. Setting the glass transition temperature in the above range allows the production of a pressure-sensitive adhesive layer with good adhesive properties.

The pressure-sensitive adhesive preferably has a moisture content of 0.4% or more, more preferably of 0.4% to 0.8%. The theoretical lower limit of the moisture content is zero. Setting the moisture content in the above range allows the production of a pressure-sensitive adhesive layer that has good adhesive properties to the retardation film. The moisture content may be a value determined by a process that includes placing the pressure-sensitive adhesive layer in an air circulation type thermostatic oven at 150° C. and determining the weight loss ratio after a lapse of one hour.

F. Liquid Crystal Display Panel

FIGS. 6(a) and 6(b) are schematic cross-sectional view of liquid crystal display panels according to preferred embodiments of the invention. It should be noted that the length, width and thickness of each component in FIGS. 6(a) and 6(b) are not shown in a true ratio for convenience of easy reference.

Referring to FIG. 6(a), a liquid crystal panel 100 includes a liquid crystal cell 50 and a laminated film 10 according to the invention on one side of the liquid crystal cell 50. Preferably, a reflecting film (not shown) or a second polarizing plate (not shown) may be placed on the other side of the liquid crystal cell 50. When the second polarizing plate is placed, it is preferably placed such that the direction of its absorption axis is substantially orthogonal to the direction of the absorption axis of the polarizer 21. As used herein, the term "substantially orthogonal" is intended to include the case where the angle between the directions of the absorption axes of the polarizer 21 and the second polarizing plate (polarizer) is 90°±2.0°, preferably 90°±1.0°, more preferably 90°±0.5°. In an embodiment of the invention, the polarizers placed on both sides of the liquid crystal cell may be the same or different.

Referring to FIG. 6(b), a liquid crystal panel 101 includes a liquid crystal cell 50, a laminated film 10 according to the invention on one side of the liquid crystal cell 50, and another laminated film 10' according to the invention on another side of the liquid crystal cell 50. The laminated film 20 is preferably placed such that the direction of the absorption axis of the polarizer 21 is substantially orthogonal to the direction of the absorption axis of the polarizer 21'. The term "substantially orthogonal" is intended to include the case where the angle between the directions of the absorption axes of the polarizer 21 and the second polarizing plate (polarizer) is 90°±2.0°, preferably 90°±1.0°, more preferably 90°±0.5°. In an embodiment of the invention, the laminated films 10 and 10' may be the same or different.

Referring to FIG. 1, the liquid crystal cell 50 for use in the invention includes a pair of substrates 51 and 51' and a liquid crystal layer 12 serving as a display medium sandwiched between the substrates 51 and 51'. One substrate (active matrix substrate) 51' is provided with a switching element (typically TFT) for controlling the electro-optical properties of the liquid crystal, scanning lines for supplying gate signals to the active element, and signal lines for supplying source signals to the active element (all not shown). The other substrate (color filter substrate) 51 is provided with a color filter. Alternatively, the color filter may be placed on the active matrix substrate 51'. Alternatively, the color filter may be omitted, for example, in a field sequential system where three color (RGB) light sources are used as lighting means for a liquid crystal display. The distance between the substrates 51 and 51' (cell gap) is controlled by means of spacers (not shown). An alignment film (not shown), which is for example made of polyimide, is provided on the side of the substrate 51 or 51' to be in contact with the liquid crystal layer 52.

F. Liquid Crystal Display

FIG. 7 is a schematic cross-sectional view of a liquid crystal display according to a preferred embodiment of the invention. It should be noted that the length, width and thickness of each component in FIG. 7 is not shown in a true ratio for convenience of easy reference. The liquid crystal display 200 includes a liquid crystal display panel 100 (or 101) and a backlight unit 80 placed on one side of the liquid crystal display panel 100. While a direct type backlight unit is used in the illustrated example, it may be replaced with another type such as a sidelight type. When a direct type is used, the backlight unit 80 may include at least a backlight 81, a reflecting film 82, a diffusing plate 83, a prism sheet 84, and a brightness enhancement film 85. When a sidelight type is used, the backlight unit may include at least the above components and a light-guiding plate and a light reflector. The use of these optical components allows the production of a liquid crystal display with better display characteristics. As long as the effects of the invention are achieved, the optical components illustrated in FIG. 7 may be partially omitted or replaced with any other optical component, depending on the type of illumination for the liquid crystal display, the drive mode of the liquid crystal cell, or any other application.

The liquid crystal display may be a transmissive liquid crystal display, in which the screen is viewed while light is applied to the backside of the liquid crystal display panel, or a reflective liquid crystal display, in which the screen viewed while light is applied to the viewer side of the liquid crystal display panel. Alternatively, the liquid crystal display may be a transflective liquid crystal display, which combines the characteristics of a transmissive type with those of a reflective type. The liquid crystal display of the invention is preferably a transmissive one, because such a display can have a relatively high contrast ratio in oblique directions.

Any appropriate structure may be used for the backlight. The backlight structure may be typically of "a direct type," which applies light from directly below a liquid crystal display panel, or "an edge-lighting type," which applies light from the side end of a liquid crystal display panel. The structure of the lighting means is preferably of a direct type, because the direct type backlight can achieve relatively high brightness.

Any appropriate light source may be used for the backlight, depending on the purpose. Examples of such a backlight source include cold cathode fluorescent tubes (CCFLs), light-emitting diodes (LEDs), organic EL devices (OLEDs), and field emission devices (FEDs). When a light-emitting diode is used for the backlight, the light source may produce white or three colors RGB. When the light-emitting diodes are used as three color RGB light sources, a field sequential liquid crystal display may be obtained which allows color display without color filters.

The reflecting film is used to prevent light from escaping to the side opposite to the viewer side of the liquid crystal and to efficiently introduce light from the backlight into the light-guiding plate. For example, the reflecting film may be a silver-vapor-deposited polyethylene terephthalate film or a laminated film composed of multilayers of polyester resin. The reflecting film preferably has a reflectance of 90% or more over the wavelength range of 410 nm to 800 nm. The reflecting film generally has a thickness of 50 μm to 200 μm. A commercially available reflecting film may be used as the reflecting film without modification. Examples of the commercially available reflecting film include REFWHITE series manufactured by Kimoto Co., Ltd. and Vikuiti ESR series manufactured by Sumitomo 3M Limited.

The light-guiding plate is used to distribute light from the backlight throughout the screen. For example, the light-guiding plate may be a tapered product of an acrylic resin, a polycarbonate resin, a cycloolefin resin or the like whose thickness decreases as it goes away from the light source.

The diffusing plate is used to guide the light from the light-guiding plate into a wide angle and to evenly brighten the screen. For example, the diffusing plate may be a roughened polymer film or a diffusing agent-containing polymer film. The diffusing plate preferably has a haze of 85% to 92%. Additionally, the total light transmittance of the diffusing plate is 90% or more. A commercially available diffusing plate may be used as the diffusing plate without modification. Examples of the commercially available diffusing plate include OPLUS series manufactured by KEIWA Inc. and LIGHTUP series manufactured by Kimoto Co., Ltd.

The prism sheet is used to concentrate the wide-angle light from the light-guiding plate in a specific direction and to enhance the brightness of the liquid crystal display in the normal direction. For example, the prism sheet may be a laminate including a base film of a polyester resin and a prism layer of an acrylic resin or a photosensitive resin stacked on the surface of the base film. A commercially available prism sheet may be used as the prism sheet without modification. Examples of the commercially available prism sheet include DIAART series manufactured by Mitsubishi Rayon Co., Ltd.

The brightness enhancement film is used to enhance the brightness of the liquid crystal display in the normal and oblique directions. A commercially available brightness enhancement film may be used without modification. Examples of the commercially available brightness enhancement film include NIPOCS PCF series manufactured by Nitto Denko Corporation and Vikuiti DBEF series manufactured by Sumitomo 3M Limited.

G. Display Characteristics of Liquid Crystal Display

When a black image is displayed, the liquid crystal display including the liquid crystal display panel of the invention preferably has a maximum Y value of 0.5 or less, more preferably of 0.4 or less, particularly preferably of 0.3 or less, at a polar angle of 60° along all azimuth angles (0° to 360°). When a black image is displayed, the liquid crystal display preferably has an average Y value of 0.3 or less, more preferably of 0.2 or less, particularly preferably of 0.1 or less, at a polar angle of 60° along all azimuth angles (0° to 360°). The Y value is a tristimulus value Y defined in the CIE 1931 XYZ system and has a theoretical lower limit of 0. The fact that this value is smaller indicates that the amount of leakage of light in oblique directions is smaller when a black image is displayed on the screen of the liquid crystal display.

When a black image is displayed, the liquid crystal display preferably has a maximum color shift ($\Delta a^* b^*$) of 8.0 or less, more preferably of 6.0 or less, particularly preferably of 4.0 or less, at a polar angle of 60° along all azimuth angles (0° to 360°). When a black image is displayed, the liquid crystal display preferably has an average color shift ($\Delta a^* b^*$) of 4.0 or less, more preferably of 3.0 or less, particularly preferably of 2.0 or less, at a polar angle of 60° along all azimuth angles (0° to 360°). The $\Delta a^* b^*$ is a value calculated from the formula: $\{(a^*)2+(b^*)2\}^{1/2}$, wherein a* and b* are chromatic coordinates defined in the CIE 1976 L*a*b* color space. The $\Delta a^* b^*$ has a theoretical lower limit of 0. The fact that this value is smaller indicates that changes in color in oblique directions are smaller when a black image is displayed on the screen of the liquid crystal display.

H. Uses of the Liquid Crystal Display of the Invention

The liquid crystal display of the invention may be used in any appropriate application. Examples of the application include OA equipment such as personal computer monitors, notebook computers, and copy machines; portable equipment such as cellular phones, watches, digital cameras, personal digital assistances (PDAs), and portable game machines; household appliance such as video cameras, televisions, and microwave ovens; vehicle equipment such as back monitors, monitors for car navigation systems, and car audios; display equipment such as information monitors for stores; alarm systems such as surveillance monitors; and care and medical equipment such as care monitors and medical monitors.

The liquid crystal display of the invention is preferably used for televisions. In particular, the liquid crystal display of the invention is preferably used for large-sized televisions.

The screen size of such televisions is preferably at least 17-inch wide (373 mm×224 mm), more preferably at least 23-inch wide (499 mm×300 mm), particularly preferably at least 26-inch wide (566 mm×339 mm), most preferably at least 32-inch wide (687 mm×412 mm).

EXAMPLES

The invention is further described using the examples and the comparative examples below, which are not intended to limit the scope of the invention. The analytical methods below were each used in the examples.

(1) Method for Measuring the Single-Piece Transmittance, Degree of Polarization, and Hue Values a and b of Polarizing Plate The measurement was performed at 23° C. using a spectrophotometer DOT-3 (trade name, manufactured by Murakami Color Research Laboratory).

(2) Method for Measuring Molecular Weights

Molecular weights were calculated by a gel permeation chromatography (GPC) method using polystyrene as a standard sample. Specifically, the measurement was performed using the equipment, tools, measurement conditions, and samples below.

Measured samples: Each sample was dissolved in tetrahydrofuran to form a 0.1% by weight solution. The solution was allowed to stand overnight and then filtered through a 0.45 μm membrane filter. The resulting filtrate was used in the measurement.

Analytical equipment: "HLC-8120GPC" manufactured by Tosoh Corporation
Columns: TSK gel Super HM-H/H4000/H3000/H2000
Column size: each 6.0 mm I.D.×150 mm
Eluent: tetrahydrofuran
Flow rate: 0.6 ml/minute
Detector: RI
Column temperature: 40° C.
Injection amount: 20 μl (3) Method for Measuring Thickness For thicknesses of less than 10 μm, measurement was performed using a spectrophotometer for thin films, Instant Multi-Photometry System "MCPD-2000" (trade name, manufactured by Otsuka Electronics Co., Ltd.). For thicknesses of 10 μm or more, measurement was performed using a digital micrometer Model "KC-351C" (trade name, manufactured by Anritsu Company).

(4) Method for Measuring the Average Refractive Index of Films

The measurement was performed using an Abbe refractometer "DR-M4" (trade name, manufactured by ATAGO CO., LTD.), and the average refractive index was determined from refractive indexes measured at 23° C. and a light wavelength of 589 nm.

(5) Method for Measuring Retardations (Re[480], Re[590] and Rth[590])

The retardations were measured at 23° C. and light wavelengths of 480 nm and 590 nm using "KOBRA21-ADH" (trade name, manufactured by Oji Scientific Instruments).

(6) Method for Measuring Transmittance (T[590])

The transmittance was measured at 23° C. and a light wavelength of 590 nm using an ultraviolet-visible spectrophotometer "V-560" (product name, manufactured by JASCO Corporation).

(7) Method for Measuring Absolute Value of Photoelastic Coefficient (C[590])

While stress (5 to 15 N) was applied to a sample (2 cm×10 cm in size) supported at both ends, the retardation of the center of the sample was measured (23° C./a wavelength of 590 nm) using a spectroscopic ellipsometer "M-220" (product name, manufactured by JASCO Corporation). The photoelastic coefficient was calculated from the slope of a function of the stress and the retardation.

(8) Method for Measuring Shrinkage Rate of Shrinkable Films

The shrinkage rate was determined according to the heat shrinkage A method of JIS Z 1712 (1997), except that 140° C. (or 160° C.) was used as the heating temperature in place of 120° C. and that a load of 3 g was applied to the test piece. Specifically, five 20 mm-wide, 150 mm-long test pieces are sampled along each of the machine direction [MD] and the transverse direction [TD] and each finished by putting gauge marks about 100 mm apart at the central portion. The test pieces were vertically hung with a load of 3 g applied thereto in an air circulation type drying oven kept at a temperature of 140° C.±3° C. (or 160° C.±3° C.), heated for 15 minutes and then taken out. The test pieces were then allowed to stand under the standard conditions (room temperature) for 30 minutes. The distance between the gauge marks was then measured with a vernier caliper according to JIS B 7507, and the average of five measurements was calculated. The shrinkage rate was calculated according to the formula: $S(\%)=[\{(\text{the distance (mm) between the gauge marks before heating})-(\text{the distance (mm) between the gauge marks after heating})\}/\{(\text{the distance (mm) between the gauge marks before heating})\}]\times 100$.

(9) Method for Measuring Shrinkage Stress of Shrinkable Film

The shrinkage stress $T^{140}$[TD] at 140° C. in the transverse direction [TD] and the shrinkage stress $T^{150}$[TD] at 150° C. in the transverse direction [TD] were measured by TMA method using the equipment below.

Equipment: "TMA/SS 6100" manufactured by Seiko Instruments Inc.
Data processing: "EXSTAR 6000" manufactured by Seiko Instruments Inc.
Measurement mode: constant temperature rising rate measurement (10° C./minute)
Measurement atmosphere: the air (23° C.)
Load: 20 mN
Sample size: 15 mm×2 mm (the long side is along the transverse direction [TD])

(10) Method for Measuring the Adhesive Force of Pressure-Sensitive Adhesive Layer A 25-mm wide sample was pressed against a glass plate by one reciprocation of a 2 kg roller to bond the sample to the glass plate, then aged at 23° C. for 1 hour, and then measured for adhesive strength when the sample was peeled in a 90-degree direction at a rate of 300 mm/minute.

(11) Method for Measuring the Anchoring Force of Pressure-Sensitive Adhesive Layer A laminate of the pressure-sensitive adhesive layer and the retardation film each with a width of 25 mm was pressed against the treated surface of an indium tin oxide (ITO)-vapor-deposited polyethylene terephthalate film ("125 Tetlight OES" (trade name) 125 μm in thickness, manufactured by Oike & Co., Ltd.) by one reciprocation of a 2 kg roller to bond the laminate to the polyethylene terephthalate film, then aged at 23° C. for 1 hour, and then measured for adhesive strength when the polyethylene terephthalate film was peeled together with the pressure-sensitive adhesive layer in a 180-degree direction at a rate of 300 mm/minute.

(12) Method for Measuring the Glass Transition Temperature (Tg) of Pressure Sensitive Adhesive According to JIS K 7121, the glass transition temperature was measured by DSC method using a differential scanning calorimeter "DSC 220C" (product name) manufactured by Seiko Instruments Inc.

(13) Method for Measuring the Moisture Content of Pressure-Sensitive Adhesive

The pressure-sensitive adhesive layer was placed in an air circulation type thermostatic oven at 150° C. and measured for weight loss after a lapse of one hour. The moisture content of the pressure-sensitive adhesive was calculated from the rate of the weight loss: $\{(W_1-W_2)/W_1\}\times 100$, wherein $W_1$ is the weight of the pressure-sensitive adhesive layer before it is placed in the air circulation type thermostatic oven, and $W_2$ is the weight of the pressure-sensitive adhesive layer after it is placed in the air circulation type thermostatic oven.

(14) Method for Measuring the Gel Fraction of Pressure-Sensitive Adhesive

A pressure-sensitive adhesive sample was measured for weight in advance and placed in a vessel filled with ethyl acetate. The pressure-sensitive adhesive sample was allowed to stand at 23° C. for 7 days and then taken out. After the solvent was wiped off the sample, its weight was measured. Its gel fraction was calculated from the formula: $\{(W_A-W_B)/W_A\}\times 100$, wherein $W_A$ is the weight of the pressure-sensitive adhesive layer before it is placed in ethyl acetate, and $W_B$ is the weight of the pressure-sensitive adhesive layer after it is placed in ethyl acetate.

(15) Method for Measuring the Amount (Y) of Leakage of Light From Liquid crystal display After the light was turned on and allowed to run for 30 minutes in a dark room at 23° C., tristimulus Y values defined in the CIE 1931 XYZ system were measured with "EZ Contrast 160D" (product name) manufactured by ELDIM along azimuth angles of 0° to 360° at a polar angle of 60° with respect to the screen on which a black image was displayed. In the measurement, the long side direction of the liquid crystal display panel was defined as being at an azimuth angle of 0°, and the normal direction was defined as being at a polar angle of 0°.

(16) Method for Measuring the Amount ($\Delta a^*b^*$) of Color Shift of Liquid Crystal Display After the light was turned on and allowed to run for 30 minutes in a dark room at 23° C., chromatic coordinates $a^*$ and $b^*$ defined in the CIE 1976 $L^*a^*b^*$ color space were measured with "EZ Contrast 160D" (product name) manufactured by ELDIM along azimuth angles of 0° to 360° at a polar angle of 60° with respect to the screen on which a black image was displayed. The amount of color shift ($\Delta a^*b^*$) in the oblique direction was calculated from the formula: $\{(a^*)2+(b^*)2\}^{1/2}$.

Preparation of Retardation Films

Reference Example 1

A shrinkable film A (a 60 μm-thick, polypropylene-containing, biaxially-stretched film ("TORAYFAN BO 2873" (trade name) manufactured by TORAY INDUSTRIES, INC.) was bonded to both sides of a 100 μm-thick polymer film containing a resin of a hydrogenated ring-opening polymer of a norbornene monomer (a norbornene resin) ("ZEONOR ZF-14-100" (trade name) 1.52 in average refractive index, 136° C. in Tg, 3.0 nm in Re[590], and 5.0 nm in Rth[590], manufactured by OPTES INC.) with an acrylic pressure-sensitive adhesive layer (15 μm in thickness) interposed therebetween. The laminated film was then held in the machine direction of the film by means of a roll stretching machine and stretched to 1.38 times in an air circulation type oven at 146° C. After the stretching, each shrinkable film A was separated together with each acrylic pressure-sensitive adhesive layer so that a retardation film was prepared. The retardation film was named Retardation Film A, and its properties are shown in Table 1. The retardation film had a refractive index ellipsoid satisfying the relation nx>nz>ny, and its wave dispersion (D) was 1.00. The physical properties of the shrinkable film A are shown in Table 2.

TABLE 1

| | Stretching Conditions | | | Retardation Film | | | |
|---|---|---|---|---|---|---|---|
| | Shrinkable Film | Temperature (° C.) | Ratio (times) | | Thickness (μm) | Nz Coefficient | Re [590] (nm) | Rth [590] (nm) | $C \times 10^{-12}$ (Absolute Value) ($m^2/N$) |
| Reference Example 1 | A | 146 | 1.38 | A | 108 | 0.50 | 270.0 | 135.0 | 3.1 |
| Reference Example 2 | A | 140 | 1.08 | B | 107 | 0.11 | 116.3 | 12.6 | 3.1 |
| Reference Example 3 | A | 150 | 1.20 | C | 118 | 0.18 | 146.1 | 26.9 | 3.1 |
| Reference Example 4 | A | 145 | 1.20 | D | 110 | 0.29 | 170.0 | 49.3 | 3.1 |
| Reference Example 5 | A | 146 | 1.38 | E | 147 | 0.36 | 194.0 | 69.8 | 5.2 |
| Reference Example 6 | A | 148 | 1.35 | F | 114 | 0.39 | 219.1 | 85.7 | 3.1 |
| Reference Example 7 | A | 148 | 1.40 | G | 111 | 0.44 | 245.1 | 106.6 | 3.1 |
| Reference Example 8 | B | 146 | 1.43 | H | 144 | 0.52 | 288.0 | 150.0 | 5.2 |
| Reference Example 9 | C | 146 | 1.42 | I | 141 | 0.60 | 271.0 | 163.0 | 5.2 |
| Reference Example 10 | A | 143 | 1.58 | J | 46 | 0.50 | 145.0 | 72.5 | 3.1 |
| Reference Example 11 | A | 143 | 1.52 | K | 47 | 0.47 | 132.0 | 62.0 | 3.1 |

TABLE 1-continued

| | | Stretching Conditions | | | | | Retardation Film | | |
|---|---|---|---|---|---|---|---|---|---|
| | Shrinkable Film | Temperature (° C.) | Ratio (times) | | Thickness (μm) | Nz Coefficient | Re [590] (nm) | Rth [590] (nm) | $C \times 10^{-12}$ (Absolute Value) (m²/N) |
| Reference Example 12 | A | 143 | 1.45 | L | 48 | 0.46 | 119.0 | 54.6 | 3.1 |
| Reference Example 13 | D | 147 | 1.27 | M | 64 | 0.50 | 270.0 | 135.0 | 50 |

TABLE 2

| Shrinkable Film | | A | B | C | D |
|---|---|---|---|---|---|
| Shrinkage Rate at 140° C. in Machine direction $S^{140}$ [MD] | (%) | 6.4 | — | — | 5.7 |
| Shrinkage Rate at 140° C. in Transverse Direction $S^{140}$ [TD] | (%) | 12.8 | — | — | 7.6 |
| $S^{140}$ [TD]-$S^{140}$ [MD] | (%) | 6.4 | — | — | 19 |
| Shrinkage Rate at 160° C. in Machine direction $S^{160}$ [MD] | (%) | 19.6 | 19.7 | 17 | 18 |
| Shrinkage Rate at 160° C. in Transverse Direction $S^{160}$ [TD] | (%) | 45.5 | 45.3 | 39.7 | 35.7 |
| $S^{160}$ [TD]-$S^{160}$ [MD] | (%) | 25.9 | 25.6 | 22.7 | 17.7 |
| Shrinkage Stress at 140° C. in Transverse Direction $T^{140}$[TD] | (N/2 mm) | 0.65 | 0.63 | 0.54 | 0.45 |
| Shrinkage Stress at 150° C. in Transverse Direction $T^{150}$[TD] | (N/2 mm) | 0.75 | 0.74 | 0.65 | 0.56 |

Reference Examples 2, 3, 4, 6, and 7

Retardation Films B, C, D, F, and G were prepared using the process of Reference Example 1, except that the stretching conditions shown in Table 2 were used instead. The properties of the retardation films are shown in Table 1. These retardation films each had a refractive index ellipsoid satisfying the relation nx>nz>ny, and their wave dispersion (D) was 1.00.

Reference Example 5

A shrinkable film A was bonded to both sides of a 130 μm-thick polymer film ("ARTON FLZU 130D0" (trade name) 78,200 in weight average molecular weight, 1.53 in average refractive index, 135° C. in Tg, 3.0 nm in Re[590], and 5.0 nm in Rth[590], manufactured by JSR Corporation) containing a resin of a hydrogenated ring-opening polymer of a norbornene monomer (norbornene resin) with an acrylic pressure-sensitive adhesive layer (15 μm in thickness) interposed therebetween. The laminated film was then held in the machine direction of the film by means of a roll stretching machine and stretched to 1.38 times in an air circulation type oven at 146° C. After the stretching, each shrinkable film A was separated together with each acrylic pressure-sensitive adhesive layer so that a retardation film (named Retardation Film E) was prepared. Its properties are shown in Table 1. The retardation film had a refractive index ellipsoid satisfying the relation nx>nz>ny, and its wave dispersion (D) was 1.00.

Reference Example 8

Retardation Film H was prepared using the process of Reference Example 5, except that the draw ratio was 1.43 times and that a shrinkable film B (a 60 μm-thick, polypropylene-containing, biaxially-stretched film) was used instead. Its properties are shown in Table 1. This retardation film had a refractive index ellipsoid satisfying the relation nx>nz>ny, and its wave dispersion (D) was 1.00. The physical properties of the shrinkable film B are shown in Table 2.

Reference Example 9

Retardation Film I was prepared using the process of Reference Example 5, except that the draw ratio was 1.42 times and that a shrinkable film C (a 60 μm-thick, polypropylene-containing, biaxially-stretched film) was used instead. Its properties are shown in Table 1. This retardation film had a refractive index ellipsoid satisfying the relation nx>nz>ny, and its wave dispersion (D) was 1.00. The physical properties of the shrinkable film C are shown in Table 2.

Reference Examples 10, 11 and 12

Retardation Films J, K and L were prepared using the process of Reference Example 1, except that a 40 μm-thick polymer film ("ZEONOR ZF-14-40" (trade name) 1.52 in average refractive index, 136° C. in Tg, 1.0 nm in Re[590], and 3.0 nm in Rth[590], manufactured by OPTES INC.) containing a resin of a hydrogenated ring-opening polymer of a norbornene monomer (norbornene resin) was used instead and that the stretch conditions were set as shown in Table 1. The properties of these retardation films are shown in Table 1. These films each had a refractive index ellipsoid satisfying the relation nx>nz>ny, and their wave dispersion (D) was 1.00.

Reference Example 13

A shrinkable film D (a 60 μm-thick, polypropylene-containing, biaxially-stretched film ("TORAYFAN BO 2570A" (trade name) manufactured by TORAY INDUSTRIES, INC.) was bonded to both sides of a 55 μm-thick polymer film (ELMEC (trade name) 60,000 in weight average molecular weight, 1.53 in average refractive index, 136° C. in Tg, 1.0 nm in Re[590], and 3.0 nm in Rth[590], manufactured by Kaneka Corporation) with an acrylic pressure-sensitive adhesive layer (15 μm in thickness) containing a polycarbonate resin interposed therebetween. The laminated film was then held in the machine direction of the film by means of a roll stretching machine and stretched to 1.27 times in an air circulation type oven at 147° C. After the stretching, each shrinkable film D was separated together with each acrylic pressure-sensitive adhesive layer so that a retardation film (named Retardation Film M) was prepared. Its properties are shown in Table 1. The retardation film had a refractive index ellipsoid satisfying the relation nx>nz>ny, and its wave dispersion (D) was 1.08. The physical properties of the shrinkable film D are shown in Table 2.

FIG. 8 is a graph showing the relationship between the in-plane retardation Re[590] and the Nz coefficient of each of the retardation films obtained in Reference Examples 1 to 12. FIG. 9 is a graph showing the relationship between the in-plane retardation Re[590] and the thickness direction retardation Rth[590] of each of the retardation films obtained in Reference Examples 1 to 12. As shown above, retardation films having different retardation values and Nz coefficients and also having a refractive index ellipsoid satisfying the relation nx>nz>ny were actually obtained using specific shrinkable films, specific stretching methods and specific stretching conditions.

Preparation of Polarizing Plates

Reference Example 14

A commercially available polarizing plate ("SIG1423DU" (trade name) manufactured by Nitto Denko Corporation) was used as Polarizing Plate A without modification. The polarizing plate includes a polarizer, a first protective layer placed on the liquid crystal cell side of the polarizer, and a second protective layer placed on the side opposite to the liquid crystal cell side. The first protective layer of Polarizing Plate A is substantially isotropic and has an Re[590] of 0.5 nm and an Rth[590] of 1.0 nm.

Reference Example 15

A commercially available polarizing plate ("TEG1425DU" (trade name) manufactured by Nitto Denko Corporation) was used as Polarizing Plate B without modification. The polarizing plate includes a polarizer, a first protective layer placed on the liquid crystal cell side of the polarizer, and a second protective layer placed on the side opposite to the liquid crystal cell side. The first protective layer of Polarizing Plate B has a refractive index ellipsoid satisfying the relation nx≈ny>nz and has an Re[590] of 1.3 nm and an Rth[590] of 39.8 nm.

Preparation of Pressure-Sensitive Adhesives

Reference Example 16

99 parts by weight of butyl acrylate, 1.0 part by weight of 4-hydroxybutyl acrylate, 0.3 parts by weight of 2,2-azobisisobutyronitrile, and ethyl acetate were added to a reactor vessel equipped with a cooling tube, a nitrogen introducing tube, a thermometer, and a stirrer so that a solution was formed. While nitrogen gas was blown into the solution, the solution was then subjected to a polymerization reaction at 60° C. for 4 hours to give an acrylate copolymer of butyl acrylate and 4-hydroxybutyl acrylate with a weight average molecular weight of 1,650,000.

The acrylate copolymer was diluted with ethyl acetate to form a polymer solution (1-A) with a total solids content of 30% by weight. Then 0.2 parts by weight of a dibenzoyl peroxide-containing crosslinking agent ("NYPER BO-Y" (trade name) manufactured by NOF CORPORATION), 0.02 parts by weight of trimethylolpropane-xylylene diisocyanate ("TAKENATE D110N" (trade name) manufactured by Mitsui Takeda Chemicals, Inc.), and 0.2 parts by weight of an acetoacetyl group-containing silane coupling agent ("A-100" (trade name) manufactured by Soken Chemical & Engineering Co., Ltd.), based on 100 parts by weight of the acrylate copolymer were added to the polymer solution (1-A) so that a polymer solution (1-B) was prepared. The polymer solution (1-B) was uniformly applied to the surface of a silicone release agent-treated polyethylene terephthalate film (substrate) with a fountain coater and then dried in an air circulation type thermostatic oven at 155° C. for 70 seconds so that a pressure-sensitive adhesive layer was formed on the surface of the substrate. The pressure-sensitive adhesive layer formed on the substrate surface was then placed on the corona-treated (1.2 kW/15 m/minute) surface of the Retardation Film E to form a laminate. The laminate was aged in an air circulation type thermostatic oven at 70° C. for 7 days. The resulting pressure-sensitive adhesive layer was named Pressure-Sensitive Adhesive Layer A (21 μm in thickness). Its properties are shown in Table 4. According to the invention, Retardation Film E may be replaced with any of Retardation Films A to L shown in Table 2 or with the polarizing plate shown in Table 3, and Pressure-Sensitive Adhesive Layer A may be placed

TABLE 3

| Polarizing Plate | | Reference Example 14<br>A | Reference Example 15<br>B |
| --- | --- | --- | --- |
| Properties | Single-Piece Transmittance (%) | 42.6 | 44.1 |
|  | Degree of Polarization (%) | 99.99 | 99.95 |
|  | Hue Value a | −1.5 | −1.5 |
|  | Hue Value b | 3.8 | 3.7 |
| Polarizer | Materials | Iodine-Containing Polyvinyl Alcohol Film | Iodine-Containing Polyvinyl Alcohol Film |
| First Protective Layer | Materials | Triacetyl Cellulose | Triacetyl Cellulose |
| Second Protective Layer | Materials | Triacetyl Cellulose | Triacetyl Cellulose | thereon by the same method as described in this section so that equivalent adhesive properties can be obtained.

TABLE 4

| Pressure-Sensitive Adhesive Layer | | Reference Example 16 A | Reference Example 17 B | Reference Example 18 C |
|---|---|---|---|---|
| Adhesive Force to Glass Plate ($F_{1A}$) | (N/25 mm) | 6.0 | 4.7 | 10.2 |
| Anchoring Force to Retardation Film ($F_{1B}$) | (N/25 mm) | 22.0 | 22.7 | 25.2 |
| $F_{1B} - F_{1A}$ | (N/25 mm) | 16.0 | 18.0 | 15.0 |
| Gel Fraction | (%) | 72 | 82 | 81 |
| Glass Transition Temperature | (° C.) | −38.0 | −38.0 | −27.8 |
| Moisture Content | (%) | 0.25 | 0.27 | 1.2 |

Reference Example 17

Pressure Sensitive Adhesive Layer B (21 μm in thickness) was prepared employing the process of Reference Example 16, except that trimethylolpropane-xylylene diisocyanate ("TAKENATE D110N" (trade name) manufactured by Mitsui Takeda Chemicals, Inc.) was used in an amount of 0.12 parts by weight, based on 100 parts by weight of the acrylate copolymer. The properties of Pressure-Sensitive Adhesive Layer B are shown in Table 4. According to the invention, Retardation Film E may be replaced with any of Retardation Films A to L shown in Table 2 or with the polarizing plate shown in Table 3, and Pressure-Sensitive Adhesive Layer B may be placed thereon by the same method as described in this section so that equivalent adhesive properties can be obtained.

Reference Example 18

100 parts by weight of butyl acrylate, 5 parts by weight of acrylic acid, 0.075 parts by weight of 2-hydroxyethyl acrylate, 0.3 parts by weight of 2,2-azobisisobutyronitrile, and ethyl acetate were added to a reactor vessel equipped with a cooling tube, a nitrogen introducing tube, a thermometer, and a stirrer so that a solution was formed. While nitrogen gas was blown into the solution, the solution was then subjected to a polymerization reaction at 60° C. for 4 hours to give an acrylate copolymer of butyl acrylate, acrylic acid and 2-hydroxyethyl acrylate with a weight average molecular weight of 2,200,000. The acrylate copolymer was diluted with ethyl acetate to form a polymer solution (2-A) with a total solids content of 30% by weight. To the polymer solution (2-A) were then added 0.6 parts by weight of a crosslinking agent mainly composed of an isocyanate group-containing compound ("Coronate L" (trade name) manufactured by Nippon Polyurethane Industry Co., Ltd.) and 0.075 parts by weight of γ-glycidoxypropyltrimethoxysilane ("KBM-403" (trade name) manufactured by Shin-Etsu Chemical Co., Ltd.) in this order, based on 100 parts by weight of the acrylate copolymer, so that a polymer solution (2-B) was prepared.

The polymer solution (2-B) was uniformly applied to the surface of a silicone release agent-treated polyethylene terephthalate film (substrate) with a fountain coater and then dried in an air circulation type thermostatic oven at 155° C. for 70 seconds so that a pressure-sensitive adhesive layer was formed on the surface of the substrate. The pressure-sensitive adhesive layer formed on the substrate surface was placed on the corona-treated (1.2 kW/15 m/minute) surface of the Retardation Film E to form a laminate. The laminate was aged in an air circulation type thermostatic oven at 23° C. for 7 days. The resulting pressure-sensitive adhesive layer was named Pressure-Sensitive Adhesive Layer C (21 μm in thickness). Its properties are shown in Table 4. According to the invention, Retardation Film E may be replaced with any of Retardation Films A to L shown in Table 2 or with the polarizing plate shown in Table 3, and Pressure-Sensitive Adhesive Layer C may be placed thereon by the same method as described in this section so that equivalent adhesive properties can be obtained.

Preparation of Liquid Crystal Cell

Reference Example 19

A liquid crystal display panel was taken out of an IPS mode liquid crystal cell-containing liquid crystal display (a 32-inch-V wide liquid crystal television "FACE (trade name) model No. 32LC100," 697 mm×392 mm in screen size manufactured by Toshiba Corporation). All the optical films placed on both sides of the liquid crystal cell were removed from the liquid crystal display panel, and the glass faces (front and rear) of the liquid crystal cell were cleaned. The resulting liquid crystal cell was named Liquid Crystal Cell A.

Preparation of Laminated Film

Example 1

Pressure-Sensitive Adhesive Layer A was formed on one side of Retardation Film A (obtained in Reference Example 1) by the same method as in Reference Example 16. Pressure-Sensitive Adhesive Layer C was formed on one side of Polarizing Plate A (obtained in Reference Example 14) by the same method as in Reference Example 18. The release liner was separated from Pressure-Sensitive Adhesive Layer C on Polarizing Plate A, then, with a laminator, Polarizing Plate A was bonded to the side of Retardation Film A, which was opposite to the side where Pressure-Sensitive Adhesive Layer A was provided. In this process, the laminate was formed such that the direction of the slow axis of Retardation Film A was substantially orthogonal to the direction of the absorption axis of Polarizing Plate A. Laminated Film A prepared as described above includes Polarizing Plate A, Pressure-Sensitive Adhesive Layer C (the second pressure-sensitive adhesive layer), Retardation Film A, and Pressure-Sensitive Adhesive Layer A (the first pressure-sensitive adhesive layer), which are placed in this order.

Example 2

Pressure-Sensitive Adhesive Layer A was formed on one side of Retardation Film E (obtained in Reference Example 5) by the same method as in Reference Example 16. Pressure-Sensitive Adhesive Layer C was formed on one side of Polarizing Plate B (obtained in Reference Example 15) by the same method as in Reference Example 18. The release liner was separated from Polarizing Plate B provided with Pressure-Sensitive Adhesive Layer C, and Polarizing Plate B was bonded with a laminator to the side of Retardation Film E, which was opposite to the side where Pressure-Sensitive Adhesive Layer A was provided. In this process, the laminate was formed such that the direction of the slow axis of Retardation Film E was substantially orthogonal to the direction of the absorption axis of Polarizing Plate B. Laminated Film B prepared as described above includes Polarizing Plate B, Pressure-Sensitive Adhesive Layer C (the second pressure-sensitive adhesive layer), Retardation Film E, and Pressure-Sensitive Adhesive Layer A (the first pressure-sensitive adhesive layer), which are placed in this order.

Comparative Example 1

Pressure-Sensitive Adhesive Layer A was formed on one side of Retardation Film M (obtained in Reference Example 13) by the same method as in Reference Example 16. Pressure-Sensitive Adhesive Layer C was formed on one side of Polarizing Plate A (obtained in Reference Example 14) by the same method as in Reference Example 18. The release liner was separated from Polarizing Plate A provided with Pressure-Sensitive Adhesive Layer C, and Polarizing Plate A was bonded with a laminator to the side of Retardation Film M, which was opposite to the side where Pressure-Sensitive Adhesive Layer A was provided. In this process, the laminate was formed such that the direction of the slow axis of Retardation Film M was substantially orthogonal to the direction of the absorption axis of Polarizing Plate A. Laminated Film X prepared as described above includes Polarizing Plate A, Pressure-Sensitive Adhesive Layer C (the second pressure-sensitive adhesive layer), Retardation Film M, and Pressure-Sensitive Adhesive Layer A (the first pressure-sensitive adhesive layer), which are placed in this order.

Comparative Example 2

Pressure-Sensitive Adhesive Layer C was formed on one side of Retardation Film A (obtained in Reference Example 1) by the same method as in Reference Example 18. Pressure-Sensitive Adhesive Layer C was formed on one side of Polarizing Plate A (obtained in Reference Example 14) by the same method as in Reference Example 18. The release liner was separated from Polarizing Plate A provided with Pressure-Sensitive Adhesive Layer C, and Polarizing Plate A was bonded with a laminator to the side of Retardation Film A, which was opposite to the side where Pressure-Sensitive Adhesive Layer C was provided. In this process, the laminate was formed such that the direction of the slow axis of Retardation Film A was substantially orthogonal to the direction of the absorption axis of Polarizing Plate A. Laminated Film Y prepared as described above includes Polarizing Plate A, Pressure-Sensitive Adhesive Layer C (the second pressure-sensitive adhesive layer), Retardation Film A, and Pressure-Sensitive Adhesive Layer C (the first pressure-sensitive adhesive layer), which are placed in this order.

Evaluation of the Optical Properties of Liquid Crystal Display

Example 3

Laminated Film A (obtained in Example 1) was bonded to the viewer side of the liquid crystal cell obtained in Reference Example 19 with Pressure-Sensitive Adhesive Layer A interposed therebetween such that the direction of the absorption axis of Polarizing Plate A was substantially parallel to the direction of the long side of Liquid Crystal Cell A. Polarizing Plate A' obtained by the process of Reference Example 14 was subsequently bonded to the backlight side of Liquid Crystal Cell A with Pressure-Sensitive Adhesive Layer A interposed therebetween such that the direction of the absorption axis of Polarizing Plate A' was substantially orthogonal to the direction of the long side of Liquid Crystal Cell A. Liquid crystal display panel A was combined with a backlight unit ("LIGHT-BOX 35H (trade name) for professional use" manufactured by ARGO Corporation) to form a liquid crystal display (named Liquid crystal display A). After the backlight was turned on and allowed to run for 30 minutes, the amount of color shift ($\Delta a^*b^*$) in an oblique direction and the amount of leakage of light (Y value) in an oblique direction were measured with respect to Liquid crystal display A. Its characteristics are shown in Table 5. FIG. 10 is a graph showing Y values at a polar angle of 60° along azimuth angles of 0° to 360° with respect to the liquid crystal displays of Example 3 and Comparative Example 3 described later. FIG. 11 is a graph showing $\Delta a^*b^*$ values at a polar angle of 60° along azimuth angles of 0° to 360° with respect to the liquid crystal displays of Example 3 and Comparative Example 3 described later.

After the backlight was allowed to run for 3 hours, the uniformity of the display screen of Liquid crystal display A was observed. As a result, optical unevenness was not observed, and the whole surface of the panel had a high level of display uniformity (in table 5, such display uniformity is expressed by "o"). While Laminated Film A was used in this example, the same high level of display characteristics and display uniformity can be achieved using Laminated Film B of Example 2.

Comparative Example 3

A liquid crystal display panel (named Liquid crystal display Panel X) and a liquid crystal display (named Liquid crystal display X) were prepared using the process of Example 4, except that Laminated Film X was used in place of Laminated Film A. After the backlight was turned on and allowed to run for 30 minutes, the amount of color shift ($\Delta a^*b^*$) in an oblique direction and the amount of leakage of light (Y value) in an oblique direction were measured with respect to Liquid crystal display A. Its characteristics are shown in Table 5. After the backlight was allowed to run for 3 hours, the uniformity of the screen of Liquid crystal display X was observed. As a result, optical unevenness was observed on Liquid crystal display X (in Table 5, the result is expressed by "x" with respect to display uniformity).

TABLE 5

| | Laminated Film | Polarizing Plate | Second Pressure-sensitive Adhesive Layer | Retardation Film | Pressure-Sensitive Adhesive Layer | Liquid crystal display | | | | Display Uniformity |
|---|---|---|---|---|---|---|---|---|---|---|
| | | | | | | Color Shift in Oblique Direction ($\Delta a^*b^*$) | | Light Leakage in Oblique Direction (Y) | | |
| | | | | | | Maximum | Average | Maximum | Average | |
| Example 3 | A | A | C | A | A | 3.11 | 1.27 | 0.28 | 0.14 | o |
| Comparative Example 3 | X | A | C | M | A | 10.5 | 4.28 | 0.53 | 0.31 | x |

Evaluation of Easy Peelability and Durability

Example 4

Laminated Film B (obtained in Example 2) was attached to the surface of a non-alkali glass plate ("1737" (trade name) manufactured by Corning Incorporated) with Pressure-Sensitive Adhesive Layer A interposed therebetween by means of a laminator. The resulting laminate was subsequently autoclaved under a pressure of 5 atm at 50° C. for 15 minutes in order to tightly bond Pressure-Sensitive Adhesive Layer A to the non-alkali glass plate. After a lapse of one hour, Laminated Film B was separated by hand from the resulting sample. As a result, Laminated Film B was peeled by a small force (in Table 6, such easy peelability is expressed by "o"). In addition, neither pressure-sensitive adhesive layer nor retardation film was left on the surface of the glass plate. FIG. 12 is a photograph of the surface of the glass plate after the separation of the laminated film of Example 3. The result of the peeling test is shown in Table 6 together with the results of the adhesive force and the anchoring force of each layer of Laminated Film B. While the non-alkali glass plate was used as a substitute for a liquid crystal cell in this example, the same results can be obtained using a liquid crystal cell in place of the non-alkali glass plate.

Another sample was prepared by the same method and allowed to stand in a thermostatic chamber at 80° C. and 90% RH for 500 hours. The sample was then taken out of the chamber and observed. As a result, the sample had no occurrence of peeling or bubbles (in Table 6, the result is expressed by "o" with respect to occurrence of peeling or bubbles).

Comparative Example 4

Laminated Film Y (obtained in Comparative Example 2) was attached to the surface of a non-alkali glass plate ("1737" (trade name) manufactured by Corning Incorporated) with Pressure-Sensitive Adhesive Layer C interposed therebetween by means of a laminator. The resulting laminate was subsequently autoclaved under a pressure of 5 atm at 50° C. for 15 minutes in order to tightly bond Pressure-Sensitive Adhesive Layer C to the non-alkali glass plate. After a lapse of one hour, an attempt was made to separate Laminated Film Y by hand from the resulting sample. As a result, it was impossible to peel Laminated Film Y by a small force (in Table 6, the result is expressed by "x" with respect to easy peelability). Another attempt was made to separate the laminated film by a large force. As a result, peeling occurred at the interface between the polarizing plate and the retardation film in the laminated film, and the pressure-sensitive adhesive layer and the retardation film were left on the surface of the glass plate. FIG. 13 is a photograph of the surface of the glass plate after the separation of the laminated film of Comparative Example 4.

TABLE 6

| Laminated Film | | | Example 4 B | Comparative Example 4 Y |
|---|---|---|---|---|
| First Pressure-Sensitive Adhesive Layer | Adhesive Force to Glass Plate ($F_{1A}$) | (N/25 mm) | 6.0 | 10.2 |
| | Anchoring Force to Retardation Film ($F_{1B}$) | (N/25 mm) | 22.0 | 25.2 |
| Second Pressure-Sensitive Adhesive Layer | Adhesive Force to Retardation Film ($F_{2A}$) | (N/25 mm) | 12.5 | 12.5 |
| | Anchoring Force to Polarizing Plate ($F_{2B}$) | (N/25 mm) | 20.0 | 20.0 |
| $F_{1B} - F_{1A}$ | | (N/25 mm) | 160. | 15.0 |
| $F_{2A} - F_{1A}$ | | (N/25 mm) | 6.5 | 2.3 |
| $F_{2B} - F_{1A}$ | | (N/25 mm) | 14.0 | 4.8 |
| Easy Peelabilily | | | o | x |
| Occurrence of Peeling or Bubbles (80° C. and 90% RH for 500 Hours) | | | o | |

Evaluations

As is also clear from FIGS. 10 and 11, the liquid crystal display including the laminated film of Example 1 had a high level of display characteristics with very low level of light leakage and color shift in oblique directions. Also in the liquid crystal display, distortion-included optical unevenness was not observed, and good display uniformity was exhibited. In contrast, the amounts of light leakage and color shift in an oblique direction were both relatively large in the liquid crystal display including the laminated film of Comparative Example 1, and optical unevenness was also observed in the liquid crystal display.

The laminated film of Example 2 did not cause peeling or bubbles with respect to the non-alkali glass plate even in a high-temperature, high-humidity environment and exhibited a high level of adhesive properties and easy peelability. In contrast, the laminated film of Comparative Example 2 was not easily separable from the non-alkali glass plate, and the pressure-sensitive adhesive layer and the retardation film were left on the surface of the glass plate after the separation process.

INDUSTRIAL APPLICABILITY

From the foregoing, it will be seen that the laminated film of the invention is very useful for improving the display characteristics and productivity of liquid crystal displays. The liquid crystal display including the laminated film according to the invention is suitable for use in liquid crystal televisions.

The invention claimed is:

1. A laminated film, comprising a polarizing plate, a retardation film, and a first pressure-sensitive adhesive layer provided in this order,
the polarizing plate comprising a polarizer, a first protective layer placed on a side of the polarizer where the retardation film is provided, and a second protective layer placed on another side of the polarizer which is opposite to the side where the retardation film is provided,
the retardation film being a stretched film comprising a norbornene resin,
the first pressure-sensitive adhesive layer comprising a pressure-sensitive adhesive that may be produced by crosslinking a composition comprising a (meth)acrylate (co)polymer and a crosslinking agent comprising a peroxide as a main component, and
wherein the retardation film has an in-plane retardation (Re[590]) of 80 nm to 350 nm that is measured at 23° C. and a light wavelength of 590 nm.

2. The laminated film according to claim 1, wherein the first protective layer and/or the second protective layer is a polymer film comprising a cellulose resin.

3. The laminated film according to claim 1, wherein the first protective layer is substantially optically isotropic.

4. The laminated film according to claim 1, wherein the first protective layer has a refractive index ellipsoid satisfying the relation nx≈nz>ny, wherein nx is a refractive index in a slow axis direction, ny is a refractive index in a fast axis direction, and nz is a refractive index in a thickness direction.

5. The laminated film according to claim 1, wherein the retardation film has a refractive index ellipsoid satisfying the relation nx≧nz>ny, wherein nx is a refractive index in a slow axis direction, ny is a refractive index in a fast axis direction, and nz is a refractive index in a thickness direction.

6. The laminated film according to claim 1, wherein the retardation film has an Nz coefficient of 0.1 to 0.7, wherein the Nz coefficient is calculated from the formula: Rth[590]/Re[590], wherein Re[590] is an in-plane retardation measured at 23° C. and a light wavelength of 590 nm, and Rth[590] is a retardation in a thickness direction that is measured at 23° C. and a light wavelength of 590 nm.

7. The laminated film according to claim 1, wherein the retardation film has an absolute value of photoelastic coefficient of $1\times10^{-12}$ to $10\times10^{-12}$ that is measured at 23° C. and a light wavelength of 590 nm.

8. The laminated film according to claim 1, wherein the first pressure-sensitive adhesive layer has an adhesive force ($F_A$) of 2 N/25 mm to 10 N/25 mm at 23° C. to a glass plate, wherein the adhesive force is measured by a process that comprises pressing the laminated film with a width of 25 mm against a glass plate by one reciprocation of a 2 kg roller to bond the laminate to the glass plate, aging the laminate at 23° C. for one hour, and then measuring an adhesive strength when the laminated film is peeled in a 90-degree direction at a rate of 300 mm/minute, wherein the adhesive strength is determined as the adhesive force.

9. The laminated film according to claim 1, wherein the first pressure-sensitive adhesive layer has an anchoring force ($F_B$) of 10 N/25 mm to 40 N/25 mm at 23° C. to the retardation film, wherein the anchoring force is measured by a process that comprises pressing a laminate of the pressure-sensitive adhesive layer and the retardation film each with a width of 25 mm against a surface of an indium tin oxide vapor-deposited onto a polyethylene terephthalate film by one reciprocation of a 2 kg roller to bond the laminate to the polyethylene terephthalate film, aging the laminate at 23° C. for one hour, and then measuring an adhesive strength when the polyethylene terephthalate film is peeled together with the pressure-sensitive adhesive layer in a 180-degree direction at a rate of 300 mm/minute, wherein the adhesive strength is determined as the anchoring force.

10. The laminated film according to claim 1, wherein there is a difference ($F_B-F_A$) of at least 5 N/25 mm between the anchoring force ($F_B$) of the first pressure-sensitive adhesive layer at 23° C. to the retardation film and the adhesive force ($F_A$) of the first pressure-sensitive adhesive layer at 23° C. to a glass plate,
wherein the anchoring force is measured by a process that comprises pressing a laminate of the pressure-sensitive adhesive layer and the retardation film each with a width of 25 mm against a surface of an indium tin oxide vapor-deposited onto a polyethylene terephthalate film by one reciprocation of a 2 kg roller to bond the laminate to the polyethylene terephthalate film, aging the laminate at 23° C. for one hour, and then measuring an adhesive strength when the polyethylene terephthalate film is peeled together with the pressure-sensitive adhesive layer in a 180-degree direction at a rate of 300 mm/minute, wherein the adhesive strength is determined as the anchoring force, and
the adhesive force is measured by a process that comprises pressing the laminated film with a width of 25 mm against a glass plate by one reciprocation of a 2 kg roller to bond the laminate to the glass plate, aging the laminate at 23° C. for one hour, and then measuring an adhesive strength when the laminated film is peeled in a 90-degree direction at a rate of 300 mm/minute, wherein the adhesive strength is determined as the adhesive force.

11. The laminated film according to claim 1, wherein the (meth)acrylate (co)polymer is a copolymer of a (meth)acrylate monomer having a straight or branched alkyl group of 1 to 8 carbon atoms and another (meth)acrylate monomer having a straight or branched alkyl group of 1 to 8 carbon atoms in which at least one hydrogen atom is replaced with a hydroxyl group.

12. The laminated film according to claim 1, wherein the crosslinking agent comprising the peroxide as a main component has a content of 0.01 to 1.0 part by weight, based on 100 parts by weight of the (meth)acrylate (co)polymer.

13. The laminated film according to claim 1, wherein the first pressure-sensitive adhesive layer comprises a pressure-sensitive adhesive that may be produced by crosslinking a composition comprising a (meth)acrylate (co)polymer, an isocyanate group-containing compound, a silane coupling agent, and a crosslinking agent comprising a peroxide as a main component, the isocyanate group-containing compound has a content of 0.005 to 1.0 part by weight, based on 100 parts by weight of the (meth)acrylate (co)polymer, and the silane coupling agent has a content of 0.001 to 2.0 parts by weight, based on 100 parts by weight of the (meth) acrylate (co)polymer.

14. The laminated film according to claim 1, wherein the pressure-sensitive adhesive has a glass transition temperature (Tg) of −70° C. to −10° C.

15. The laminated film according to claim 1, wherein the pressure-sensitive adhesive has a moisture content of 1.0% or less.

16. The laminated film according to claim 1, further comprising a second pressure-sensitive adhesive layer between the polarizing plate and the retardation film, wherein the second pressure-sensitive adhesive layer comprises a pressure-sensitive adhesive that may be produced by crosslinking a composition comprising a (meth)acrylate (co)polymer, a silane coupling agent, and a crosslinking agent comprising an isocyanate group-containing compound as a main component.

17. A liquid crystal display panel, comprising the laminated film according to claim 1, and a liquid crystal cell.

18. A liquid crystal display, comprising the liquid crystal panel according to claim 17.

* * * * *